United States

Lefkowitz

3,772,874

Nov. 20, 1973

[54] DISPLAY APPARATUS AND CHRONOMETER UTILIZING OPTICALLY VARIABLE LIQUID

[75] Inventor: Issai Lefkowitz, Princeton, N.J.

[73] Assignee: Princeton Materials Science, Inc., Princeton, N.J.

[22] Filed: Dec. 9, 1971

[21] Appl. No.: 206,473

[52] U.S. Cl. ............... 58/50 R, 58/4 A, 58/127 R, 58/152 A, 340/336, 350/160 LC
[51] Int. Cl. ..................... G04b 19/24, G04b 19/30
[58] Field of Search .................. 58/4, 4 A, 23 R, 58/23 A, 23 BA, 50 R, 127 A, 152 B; 340/168 R, 336; 350/16 R, 16 LC

[56] References Cited
UNITED STATES PATENTS

| | | | |
|---|---|---|---|
| 3,505,804 | 4/1970 | Hofstein | 58/23 BA |
| 3,516,242 | 6/1970 | Lehovec | 58/23 |
| 3,540,209 | 11/1970 | Zatsky et al. | 58/50 R |
| 3,322,485 | 5/1967 | Williams | 350/160 R |
| 3,612,654 | 10/1971 | Klein | 350/160 R |

*Primary Examiner*—Richard B. Wilkinson
*Assistant Examiner*—Edith C. Jackmon
*Attorney*—R. Gale Rhodes, Jr.

[57] ABSTRACT

Apparatus for providing a visible display and a chronometer for providing a visible display indicative of time, including optically variable liquid normally in a first optically visible state (transparent or light scattering), and upon the application or removal of a predetermined field to the optically variable liquid, the liquid changes into a second optically visible state (light scattering or transparent) and scatters received incident light and provides a visible display; in the application of a chronometer, the predetermined fields are developed from pulses or signals related to or indicative of time, e.g. seconds, minutes, hours, and/or days. In various embodiments optically variable liquid is disposed between a transparent electrode and reflecting electrodes and the reflecting electrodes reflect light received through the transparent electrode and the optically variable liquid when in a transparent state and provide a first optically visible state, and upon the optically variable liquid assuming the light scattering state in response to the application of pulses or signals to the transparent and reflecting electrodes, the reflecting electrodes are at least partially obscured thereby providing a second optically visible state. Also, in various embodiments, the pulses or signals providing the electric fields are provided by shift registers and the shift register stages are formed in a predetermined geometric pattern in particular portions of a body of semiconductive material and the reflecting electrodes are formed on the body of semiconductive material in substantially the same predetermined geometric pattern and the reflecting electrodes are electrically associated with the shift register such as by being formed on the body of semiconductive material in direct engagement with the particular portions in which the shift register stages are formed, or are electrically associated by lands formed on the body of semiconductive material electrically interconnecting the shift register stages and the reflecting electrodes. In other embodiments chronometers are disclosed including digital time read-out displays, analog time read-out displays, analog-digital time read-out displays, and displays structured in various physical configurations.

119 Claims, 30 Drawing Figures

DISPLAY APPARATUS AND CHRONOMETER UTILIZING OPTICALLY VARIABLE LIQUID

BACKGROUND OF THE INVENTION

1. Field of the Invention

This invention relates generally to apparatus for providing a visible display, and in particular, to display apparatus responsive to electrical signals and for providing a visible display having at least two optically visible states. The visible display provided may be representative or indicative of various natural, manmade or machine-made phenomena, events or occurrences which may be converted into or represented by electrical signals or pulses, for example, temperature, voltage, current, power, a visible display indicating that one is being paged or is receiving a telephone call, and time (seconds, minutes, hours, days, etc.).

With regard to display apparatus providing a visible display showing or indicative of time, this invention also relates generally to chronometers, and in particular, to a chronometer embodied as an electronic watch.

2. Description of the Prior Art

Many apparatus are known to the prior art for providing a visible display which may be indicative or representative of various phenomena, etc. However, such prior art apparatus generally suffer from the disability of not providing great flexibility in the design or structuring of their actual embodiments. Further, many prior art display apparatus typically have large or heavy power requirements which impose stringent limitations with regard to the smallness of size which may be obtained. Additionally, many prior art display apparatus include vast quantities of discrete wiring connections which can be unwantedly expensive, time-consuming to make, and highly susceptible to failure or ruin due to shock.

Prior art chronometers, display apparatus for providing a visible display indicative or representative of time (seconds, minutes, hours, days, etc.) are known in many and varied configurations. For example, the typical prior art chronometer or electronic watch consists generally of four basic components: (1) a display for showing time, in a conventional watch this is of course the mechanically driven hands, or in an electronic (perhaps better described as electric) watch the hands may be driven by a small electric motor; (2) a time standard such as a high frequency crystal oscillator; (3) electronics or logic for converting the high frequency oscillations into the form required to display time (seconds, minutes, hours, etc); and (4) a power supply for powering the other three components listed above.

SUMMARY

The display apparatus of the present invention provides great flexibility in the design and structuring of the actual embodiments and permits the actual embodiments to assume almost any structural configuration. In addition, various embodiments of the present invention may be made in very small physical configurations and may have very small power requirements thereby further permitting smallness of size and unattended battery powered operation for long periods of time. Further, various embodiments of the present invention greatly reduce and substantially eliminate the above-noted discrete wiring connections.

Display apparatus according to the present invention and providing at least two optically visible states may include a body of active material; means providing a transparent electrode displaced from and opposed to the body of active material; a body of optically variable liquid disposed between the transparent electrode and the body of active material and in engagement with the transparent electrode and the body of active material; means for sealing the body of optically variable liquid between the transparent electrode and the body of active material; the body of optically variable liquid normally in a first optically visible state; signal input means electrically associated with the body of active material and the transparent electrode; and upon the application of a predetermined signal to the input means the transparent electrode and the body of active material cause at least a portion of the optically variable liquid to change from the first optically visible state into a second optically visible state.

A chronometer according to the present invention and for providing a visible display indicative of time may include display means including at least one body of optically variable liquid, the liquid normally in a first optically visible state; means for providing pulses at a predetermined frequency related to time; and means for receiving the pulses and for converting the pulses into drive signals at a predetermined frequency related to time and for developing predetermined fields and for applying the fields to the body of optically variable liquid to cause the body of optically variable liquid to change periodically from the first optically visible state to a second optically visible state and periodically reflect received incident light and provide the visible display indicative of time.

Throughout of the various Figs. of the drawings structure or components having the same or similar function have been given corresponding numerical identifications.

DETAILED DESCRIPTION

Figure 1:
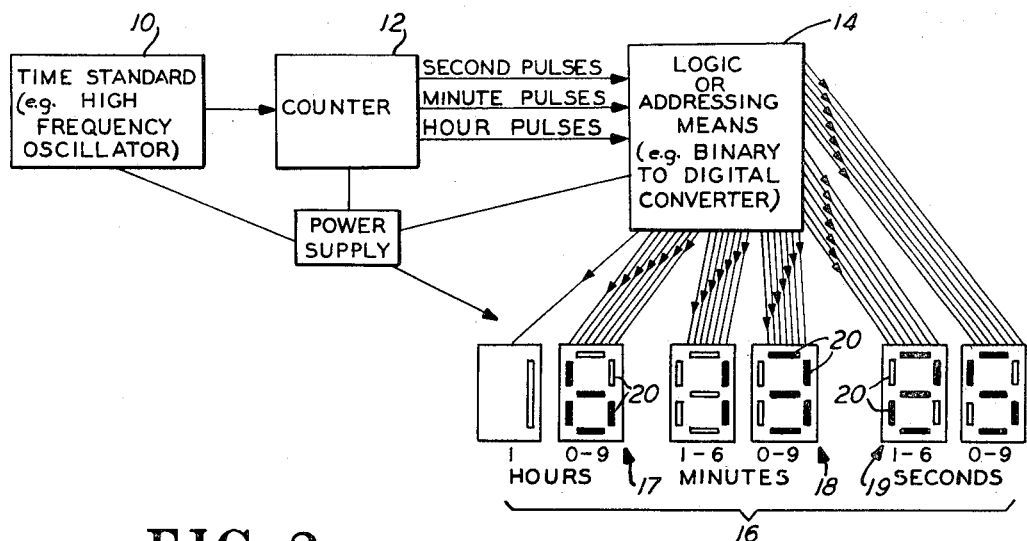
FIG. 1 illustrates a chronometer, e.g. electronic watch, embodying the present invention and including a digital nematic liquid crystal display for the read out of time.

Referring now to FIG. 1, there is shown a chronometer, e.g. an electronic watch, embodying the present invention and which includes a time standard 10, counter 12, logic or addressing means 14, and a nematic liquid crystal display indicated generally by the numerical designation 16.

The nematic liquid crystal display 16 includes a plurality of time read-out displays for providing a plurality of visible displays indicative of a plurality of units of time, viz., an hour time read-out display 17, a minute time read-out display 18, and second time read-out display 19. Each time read-out display includes two numeric indicators as shown and each numeric indicator (except the tens counter of the hour display) includes a plurality of segments 20, each of which segments 20 includes a body of nematic liquid crystal material. A description of the structure and operation of the nematic liquid crystal displays and how the electrical connection between the displays and the logic or addressing means are made, are set forth in detail below. However, for the present and with regard to the operation of the embodiment of FIG. 1, it will be understood by those skilled in the art that the displays of the present invention employ a body of optically variable liquid which is normally in a first optical or optically visible state, e.g. a transparent state and which changes from the first optical or optically visible state into a second optical or optically visible state, e.g. a light scattering state when a suitable predetermined field is applied thereto. Thus, the segments 20 are said to be activated when the bodies of optically variable liquid are changed into the light scattering state to provide visible displays.

The time standard 10 may be a high frequency oscillator, such as for example, a high frequency piezocrystal oscillator such as a quartz crystal oscillator. In response to power provided at the shown power input, for example and with particular regard to an electronic watch embodiment, power provided by a small long life battery located in the case and/or band of the watch, the oscillator provides high frequency pulses at a predetermined frequency, e.g. 32,768 Hz or higher or lower. Quartz crystal oscillators have been found to be particularly useful since with such an oscillator an accuracy of a few seconds per year can be maintained.

The pulses generated by the time standard or high frequency oscillator 10 are received by the counter 12 and counted down to seconds, then counted to minutes, hours, and in the case of a calendar watch, to days. The counter 12 may be a frequency divider, any one of several known to the art; one example being a binary counter including a plurality of bistable multivibrators (flip-flops) provided by integrated semiconductor circuits, for example but not limited to, complementary MOS circuits (CMOS). If the time standard or high frequency oscillator has a frequency of 32, 768 Hz, then in 15 stages of binary counting (i.e., 15 divide by two's) one Hz (i.e., second) pulses can be obtained. Alternatively, counting can be done in larger integers by utilizing astable multivibrators with suitable feedback for stability purposes, and less counting stages will be required than in the binary counting since frequency division can occur in steps of 3, 4 or 5, etc. However, with the present inexpensiveness of integrated circuits, the saving in counting stages provided by the larger integer counting as compared with the number of stages required in binary counting, is not overly important and the accuracy afforded by binary counting is much more significant and hence has been found to be preferable. The counter 12 receives pulses from the time standard 10 and by frequency division or counting as noted above, transforms or converts the pulses into a plurality of trains of time pulses, i.e., a train of second pulses at the frequency or rate of one pulse per second, a train of minute pulses at the frequency or rate of one pulse per minute, a train of hour pulses at the frequency or rate of one pulse per hour, and in the case of a calendar watch, a train of day pulses at a day rate.

The plurality of trains of time pulses are received by the logic or addressing means 14 where they are converted into drive signals for activating the segments 20 of the optically variable liquid display 16 in the proper sequence and at the proper time to provide the aforementioned plurality of visible displays indicative of the plurality of units of time (seconds, minutes, hours, etc.). The logic or addressing means 14 may be a binary-to-digital converter (BCD) and in the embodiment of FIG. 1, the addressing means 14 may include six binary-to-digital converters, one for each numeric indicator, and each of which converters may include a plurality of suitably connected one, two and three input gates—as is known to those skilled in the art. Using diode logic, approximately twenty gates are required for a converter for the more complicated numeric indicators or read-outs, i.e., the three numeric indicators which must display any digit between 0 and 9. The output or drive signals from the logic or addressing means 14 must be sufficiently large to activate the segments 20 of the time read-out displays 17, 18 and 19. Typically when the bodies of optically variable liquid included in the segments 20 are of the order of 10 to 30 $\mu$m thickness, the drive signals must be in the range of 10 to 30 volts. Such voltages are possible with presently available MOS circuitry, thus the binary-to-digital converters may be in the form of MOS circuitry and the output or drive signals they produce may be applied directly to the segments 20. Alternatively, low voltage logic circuitry may be employed in the logic or addressing means 14, and if used, high voltage drivers or driving circuits may be required intermediate the low voltage logic circuitry and the display segments 20.

It will be noted that the seven segment display or numeric indicator is the simplest. If necessary, or desired, more aesthetically pleasing numbers may be obtained by utilizing additional segments. And it will be further understood that such additional segments will increase the complexity of the binary to digital converters, in particular, it increases the number of logic gates required to provide the required drive signals for activating the segments 20. Also, where the low voltage logic circuitry is used, the additional segments will increase the number of drivers or drive circuits required.

It will be noted that as shown in FIG. 1, appropriate segments 20 have been activated to show or indicate the time 13 minutes and 25 seconds past 6.

Figure 2:
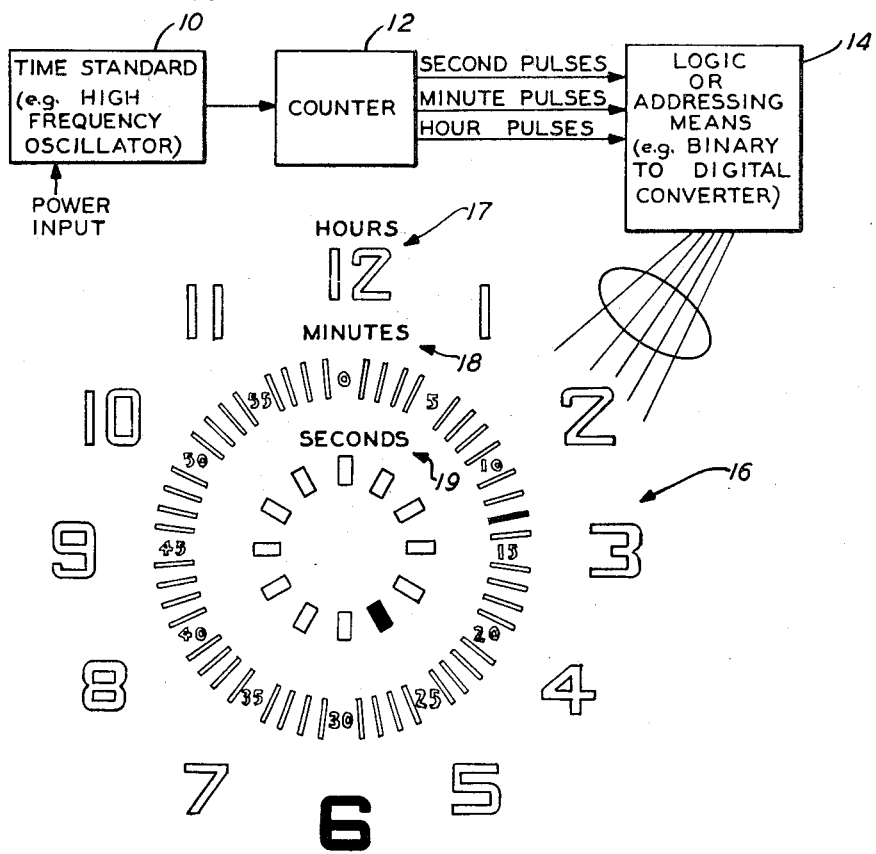
FIG. 2 illustrates a chronometer, e.g. electronic watch, embodying the present invention and including an analog-digital nematic liquid crystal display for the read out of time.

It will be noted by those skilled in the art that the nematic liquid crystal display 16 of FIG. 1 can be described as, and is essentially a digital time read out display. A conventional mechanical watch with moving hands is basically an analog device and the visible display provided by the moving hands can be described as an analog display. Accordingly, it will be understood that the optically variable liquid display 16 of the embodiment of the present invention shown in FIG. 2 can be described as an analog-digital output or display. As with the embodiment of FIG. 1, the display 16 of FIG. 2 includes a plurality of time read-out displays, namely, an hour read-out display 17, a minute time read-out display 18, and a second time read out display 19. As with the display 16 of FIG. 1, each time read-out display includes a plurality of segments or bodies of optically variable liquid normally in a first optically visible state and which, upon the application thereto or removal of a suitable, e.g. longitudinal, electric field, the bodies of optically variable material change into a second optically visible state. In the optically variable liquid display 16 of FIG. 2, discrete numbers in the case of hours are provided; in the case of the "five" minutes, numbers are provided, and in the case of the "intermediate" minutes markers in the shape of rectangles are provided; and in the case of seconds, markers in the shape of rectangles are provided at 5 second intervals. The time shown in FIG. 2 is the same as that shown in FIG. 1, namely, 13 minutes and 25 seconds past 6. In the embodiment of FIG. 2, the logic or addressing means 14 provides suitable drive signals to the display 16 for activating the numbers and markers at the proper time and in the proper sequence. It will be understood by those skilled in the art that such logic or addressing means may be a binary-to-decimal converter of the type known in the art, which binary-to-decimal converter is more complicated than the binary-to-digital converter of the logic or addressing means 14 of FIG. 1. In addition, the binary-to-decimal converter also requires more connections between it and the display 16, namely, 84 in the display 16 of FIG. 2 (132 connections were discrete seconds displayed) vs. the 36 connections required between the logic or addressing means 14 of FIG. 1 and the numeric indicators of the display 16 of FIG. 1. A significant feature of the display 16 of FIG. 2 is that the optically variable liquid time read-out display is structured such that in some instances individual numbers (e.g. the hours 6) are activated as a whole rather than in individual segments as in the numeric indicators of FIG. 1. This permits greater design flexibility, and in particular provides better formed numbers.

Figure 3:
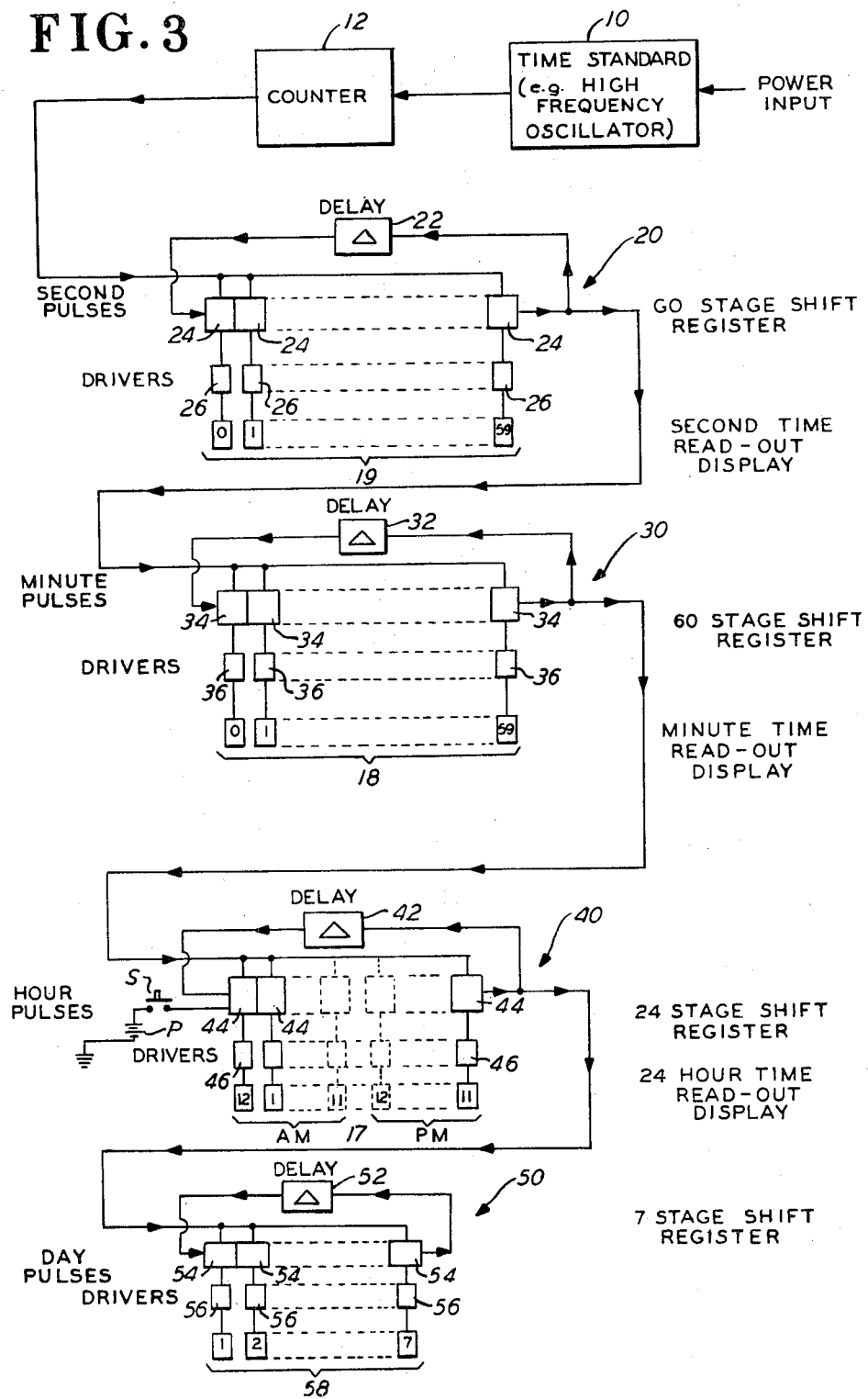
FIG. 3 illustrates a display apparatus or chronometer according to the present invention, including a plurality of serially interconnected shift registers and including a plurality of nematic liquid crystal displays for the read out of time.
Figure 4:
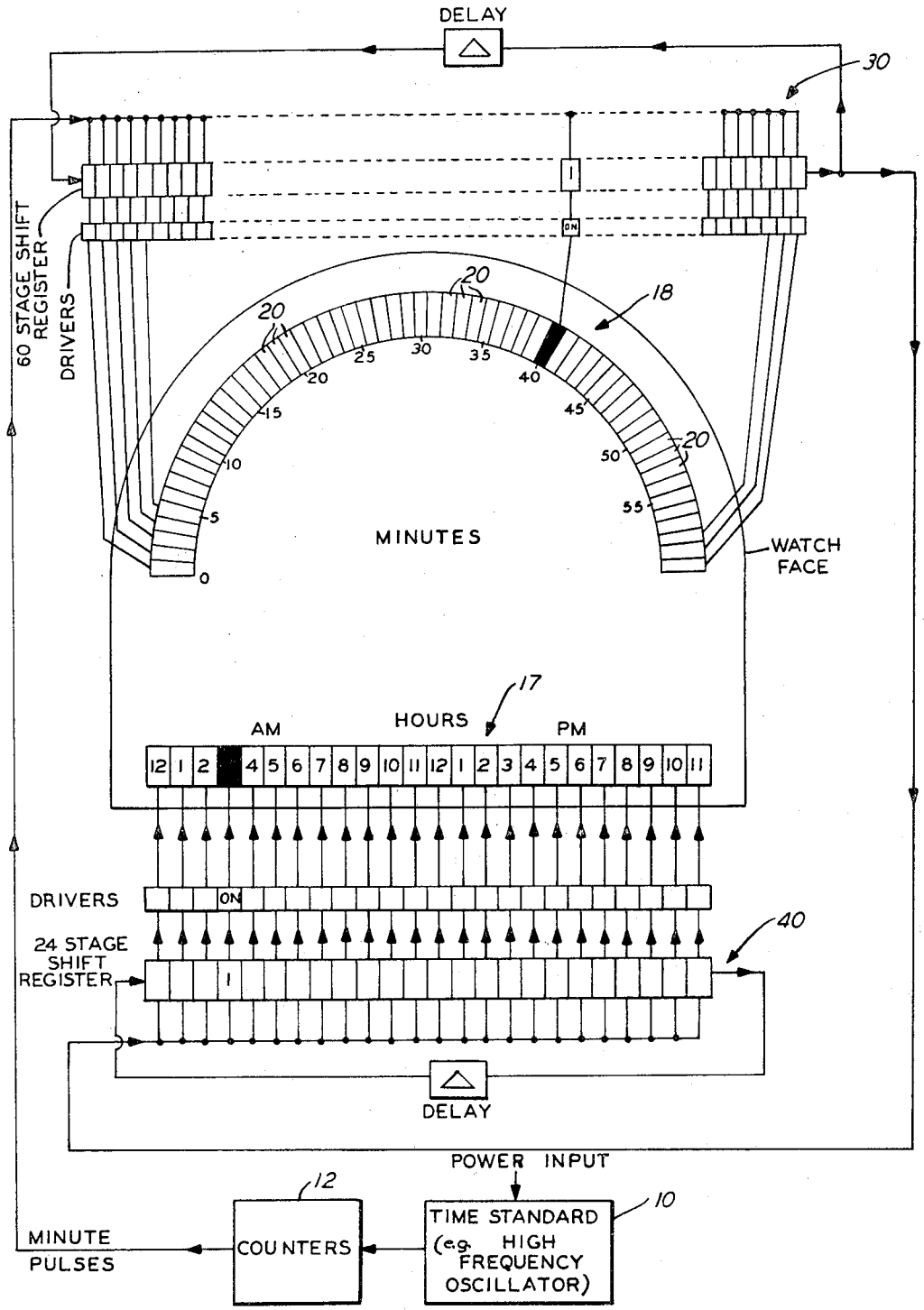
FIG. 4 illustrates a chronometer, e.g. electronic watch, embodying the present invention and illustrating detailed aspects of the present invention.

Referring now to FIGS. 3 and 4, such FIGS. illustrate diagrammatically further teachings and embodiments of the present invention. First with regard to FIG. 3, in addition to the above-described time standard 10 and counter 12, there is shown a plurality of multi stage serially interconnected shift registers or shift register circuits, identified by general numerical designations 20, 30, 40 and 50, respectively, and which shift register circuits may be comprised of discrete circuit components, provided in integrated MOS form or provided in various hybrid or combination forms. Each shift register circuit, as shown, is provided with a respectively associated delay circuit or delay means 22, 32, 42 and 52; and each delay circuit interconnects the last stage of its associated shift register circuit with the first state thereof and applies the output of the last stage delayed by a predetermined amount of delay to the first stage as input pulses for the associated shift register circuit.

The output of the counter 12 is applied in parallel to all of the stages of the shift register circuit 20 as shift pulses and, as shown in FIG. 3, it will be noted that all the stages of each succeeding shift register circuit (30, 40 and 50) are connected in parallel to the last stage of the next preceding shift register circuit so as to receive output signals from the last stage of the next preceding shift register circuit which received output signals act as shift pulses for the respective succeeding shift register circuits.

As shown in FIG. 3, the respective shift register circuits are provided with electrically associated time read-out displays 24, 34, 44, and 54, each of which time read-out displays, as is set forth in detail infra, may include a plurality of individual bodies of optically variable liquid each of which is common only to an individual shift register output, or which may include a body of optically variable liquid common to all shift register stages associated with an individual time read-out display. Alternatively, there may be a single body of optically variable liquid which may be common to all the time read-out displays.

As noted above, depending upon the voltage output level of the stages of the respective shift registers, driver circuits intermediate the shift register stages and the optically variable liquid time read-out displays may or may not be required depending upon the voltage level of the output signals from the respective stages and the thickness of the optically variable liquid of the respectively associated time read-out displays. Such drivers or drive circuits if required, may be those circuits known in the art as digital amplifiers or Schmitt-trigger circuits. The drive circuits may, as with regard to the shift register circuits, be comprised of discrete components or provided in integrated circuit form.

In the specific embodiment shown in FIG. 3, as indicated by the labels and legends provided thereon, shift register 20 and its associated time read-out display 19 provide a visible display showing or indicating seconds, and similarly the other shift registers and their associated time read-out displays show or indicate other units of time as indicated by the labels or legends. Further, it will be noted that in the specific embodiment of FIG. 3, the "seconds" shift register 20 is provided with 60 stages (stage 0 through stage 59), one for each second, and that the other shift register circuits are provided with stages equal in number to the components of each respective unit of time.

With regard to the specific shift register operation of each of the shift register circuits, it will be understood by those skilled in the art that, and by way of example with regard to shift register 20, initially a binary "1" is placed into stage 0 and, as the "second" pulses are provided from the counter 12 such pulses, acting as shift pulses, shift the "1" along through the stages of the shift register until finally after 60 "second" or shift pulses from the counter 12, the "1" is expelled from the last stage (59th stage) of the shift register as an output pulse or signal from the last stage. The output pulses or signal from the last stage are then fed back by the delay circuit 22 into the first stage (0th stage) of the "seconds" shift register 20 as an input pulse to the shift register, and the whole procedure is repeated, repetitiously. It will be understood by those skilled in the art that the delay circuit 22 provides a very short delay (typically a few m. secs.) to prevent the feedback information from being prematurely shifted out of the first stage. Further, as shown in FIG. 3 and described above, the output pulse or signal from the last stage (59th stage) of shift register 20, which occurs every 60 seconds, is applied in parallel to all the stages of shift register 30 and acts as shift pulses for the stages of shift register 30. Similarly, a binary "1" is placed in the first stage (0th stage) of "minutes" shift register 30 and is shifted along at minute intervals until it is expelled from the last stage (59th stage) as an output pulse or signal. This output pulse or signal is fed back, through a short delay circuit 32 to the first stage (0th stage of shift register 30) and also provides input pulses to the shift register 30.

It will be understood by those skilled in the art, that shift registers 40 and 50 operate similarly.

As shown in FIG. 3, the "hour" shift register 40 is shown as a 24 stage shift register capable of counting or indicating 24 hours, and alternatively, it could be a 12 stage shift register for indicating 12 hours. The output from the "hour" shift register 40, besides providing input pulses to such shift register, provides shift pulses to the "day" shift register 50. Resetting of the hour shift register may be accomplished by the provision of the source of auxiliary potential P and manually operable switch S which upon operation provides additional input pulses or signals to the first stage of the shift register to re-set the register to the desired time.

The above-described shift register operation or counting procedure can be continued with the addition of further shift registers interconnected similarly and time read-out displays indicating months and years could also be provided. In order to automatically accommodate for variations in the number of days in various months, some additional circuitry including suitable feed back connections would be required. Referring again by way of example to "seconds" shift register 20, when the stages of the shift register are operated sequentially in shift register fashion as described above, it will be understood that 60 stages (0th–59th stage) are activated sequentially to provide 60 sequentially occurring output signals which output signals, occurring sequentially one each second, are applied sequentially to the 60 (identified as 0–59) discrete elements or segments of the seconds time read-out display 19 to sequentially activate the discrete bodies of optically variable liquid of such display and provide sequentially occurring optically visible indications of the occurrence or passage of each second of 60 seconds. Similarly, the respective stages of the remaining shift register circuits provide sequentially occurring output signals which are applied to the segments or elements of their respectively associated time read-out displays to provide sequentially occurring visible indications of the passage or occurrences of the remaining time units. It will be appreciated that the respective time read out displays are operated or activated simultaneously to provide a plurality of simultaneously occurring visible indications of a plurality of units of time.

A most significant feature of the teaching illustrated and embodiment shown in FIG. 3 is that the shift register or output signals provide an unexpectedly simple technique for addressing, i.e. applying signals in the proper sequence and at the proper time to, the discrete display elements of the time read-out displays. Each shift register stage provides a dynamic read-out of an element of time or of an elapsed element of time. This significance may be better understood by referring to FIG. 4, and in the embodiment shown in FIG. 4 for simplicity and clarity of presentation only the "minute" and "hour" shift registers 30 and 40, and their respectively associated "minute" and "hour" time read-out displays 18 and 19, are shown. As may be seen from FIG. 4, each stage of each of the shift registers is coupled through a driver or driver circuit to a discrete display element of each of the time read-out displays; it being understood that each such display element includes a discrete body of optically variable liquid. As noted earlier, the driver circuits will not be needed if the voltage and current capacities of the output signals provided by the shift register stages match the voltage and current requirements for activation of the bodies of optically variable liquid.

In FIG. 4, it will be noted and understood that the "minute" shift register 30 is operating in the above-described shift register manner of operation and that a binary "1" has been shifted into and for one minute will remain in the 40th stage of the "minute" shift register 30; similarly, a binary "1" has been shifted into and will remain for one hour in the 4th stage of the "hour" shift register 40. As may be seen from FIG. 4, the "minute" display 30 is in the form of a plurality of discrete rectangularly shaped markers with appropriate adjacent (for example engraved) numbers. The discrete elements of the "hour" display are in the form or shape of numbers and when the associated body of optically varible liquid is activated and changed into the light scattering state, the numbers are obscured thereby providing a visible indication of time. The specific structure and configuration of the discrete display elements of the respective time displays are described in detail infra. The output of the 40th stage of the "minute" shift register is applied to the 40th discrete minute marker to activate the associated body of optically variable liquid, and the output of the 4th stage of the "hour" shift register is applied to the first number 3 to activate the associated body of optically variable liquid and obscure the 3. Accordingly, the time read-out displays have been activated to show or indicate the time 3:40 a.m.

Figure 5:
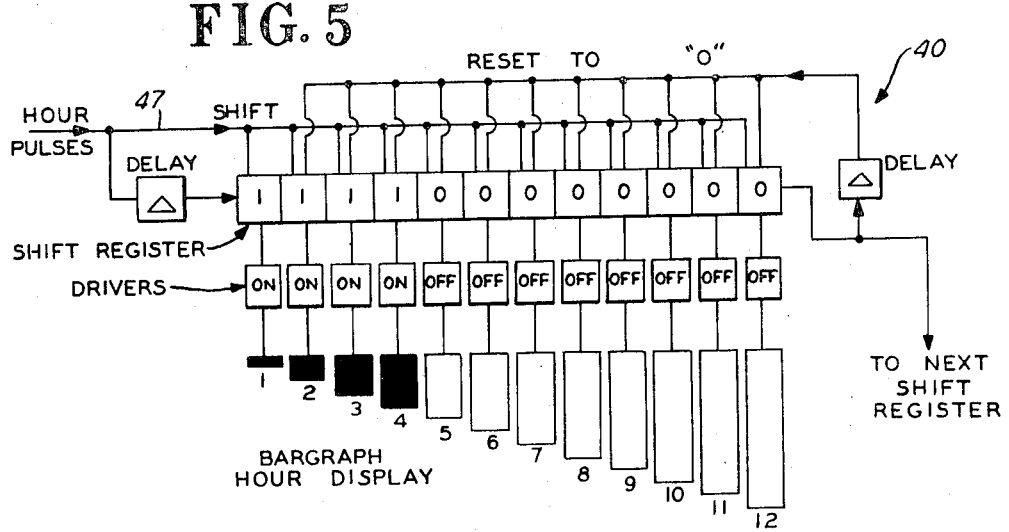
FIG. 5 illustrates a display apparatus or chronometer embodying the present invention and showing a digital bar graph read out.

Referring now to FIG. 5, there is shown an embodiment of the present invention which is a modification or variation of the embodiments shown in FIGS. 3 and 4. More specifically, the embodiment of FIG. 5 provides a digital bargraph read-out rather than a discrete read-out. In general, this is accomplished by operating the shift register stages so as to retain their information, rather than clear as in the case of the stages of the shift registers of FIGS. 3 and 4. For artistic reasons, the bargraph including the twelve discrete display elements shown have been structured so as to have a continuously increasing height. If desired, the bargraph could be structured so as to have a constant height.

As shown in FIG. 5, the first four discrete display elements have been activated and, accordingly, the time 4:00 o'clock is being displayed. With regard to the operation of the twelve stage "hour" shift register 40 shown in FIG. 5, the stages of the shift register, as noted above, are provided as will be understood by those skilled in the art in the manner understood by those skilled in the art, so as to retain their information. Thus, as time proceeds, the shift register stages gradually fill up with "1"s until at 12:00 o'clock the shift register is completely full and all display elements of the bargraph are activated. Upon the occurrence of the next "hour" pulse, the first stage of the shift register will be set into "1" state and hence the 1:00 o'clock discrete display element of the bargraph will be activated, and a pulse will be expelled from the last stage (12th stage) of the shift register which expelled pulse acts as the shift pulse for the next succeeding shift register and which pulse is applied in parallel to all of the stages of the shift register, except the first stage, as a reset pulse to reset all of the stages except the first stage back into a "zero" condition, and hence turn the 2:00 o'clock through 12:00 o'clock display elements of the bargraph off. It will be noted as indicated in FIG. 5, and understood, that the embodiment shown therein is merely the "hour" register embodiment and that, as shown in FIG. 3, there could be provided in accordance with the embodiment of FIG. 5 a plurality of serially interconnectd shift registers with each shift register being structured as taught by the shift register shown in FIG. 5. Thus, it will be noted that the "hour" time pulses, from the last stage of a preceding "minute" shift register are received by the shift register signal input 47 and are applied in parallel as shift pulses to all the stages of the shift register, in addition, the "hour" pulses are applied, delayed by a small amount of delay to the first stage of the shift register as input pulses to the shift register. The output pulse from the last stage of the shift register is applied, through a predetermined short amount of delay in parallel to all of the stages of the shift register except the first stage as reset pulses to reset the stages from the binary "1" state into the binary "0" state.

OPTICALLY VARIABLE LIQUID DISPLAY FABRICATION

The above-noted displays, as stated, may include an optically variable liquid which, upon the application or removal of a predetermined field, changes from a first optical or optically visible state (transparent or light scattering) into a second optical or optically visible state (light scattering or transparent). One of the major advantages of the optically variable liquid display is that it is basically simple to fabricate in any desired pattern. This results from the fact that since the material is a liquid it takes up the geometrical shape of the container used. The display itself, in one embodiment for example, is simply defined by transparent electrodes which are formed on the surfaces of the container in contact with the optically variable liquid. The electrodes can be formed by screening photomechanical techniques and other methods, so as to have any desired shape. Very high resolution is possible.

It will be understood by those skilled in the art that the optically variable liquid may be mesomorphic matter, such as, for example, mesomorphic matter as that disclosed by G. Fridel, Annals of Physics, Vol. 18, p. 273, 1922. Mesomorphic matter includes nematic, cholesteric, and smectic liquid crystals or materials.

The nematic liquid crystal material may be, by way of example, any nematic liquid crystals found on page 448 of KODAK Catalog No. 46, entitled "EASTMAN ORGANIC CHEMICALS," Copyright 1971 46, by Eastman Kodak Co. Nematic liquid crystal materials normally being in a transparent state, and upon the application thereto of an electric field, the nematic liquid crystal material goes into a light scattering state.

Cholesteric material, suitable for the present invention, changes upon the application of a suitable heat and thereby provides a second optical or optically visible state.

Also, optically variable liquid suitable for the practice of the present invention may be a colloidal suspension or metallic dipole suspensions such as those disclosed by A.M. Marks in U.S. Pat. No. 3,512,876. With no electric field applied to such a suspension, Brownian motion creates light scattering thereby providing a first optically visible state, and upon the application of a suitable electric field, the dipoles are aligned and the suspension becomes transparent thereby providing a second optical or optically visible state.

In addition, optically variable liquid suitable for the practice of the present invention may include pleochroic material which, upon the application of a suitable electric field changes color and thereby provides a second optically visible state.

Further, optically variable liquid suitable for the practice of the present invention may include the foregoing nematic, cholesteric and smectic liquid crystals or materials further including a predetermined dye molecule whereby such materials upon the application of a suitable electric field change into a predetermined color thereby providing a second optically visible state.

Figure 6:
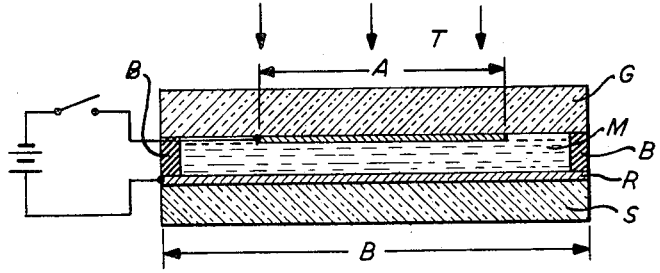
FIGS. 6-6B are respectively side elevational top and bottom views illustrating a nematic liquid crystal display which may be utilized in the present invention.
Figure 6B:
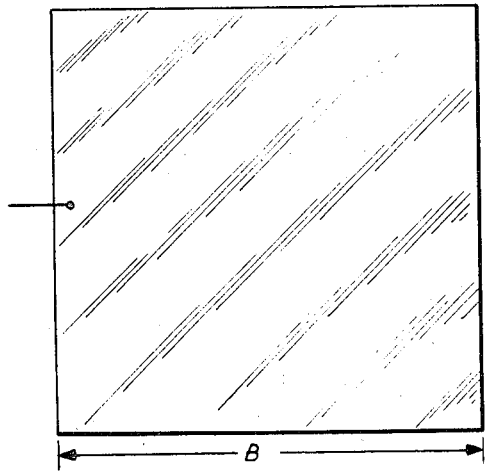
Figure 6A:
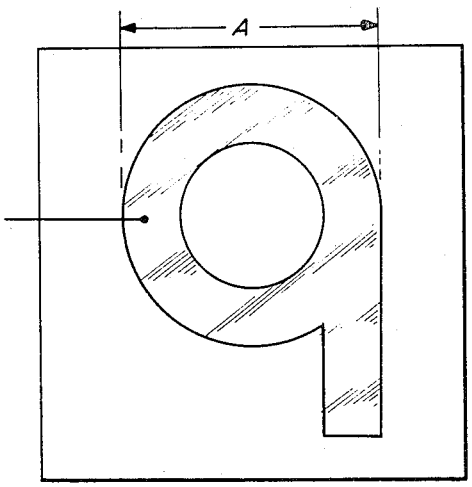

FIG. 6 illustrates an optically variable liquid display suitable for displaying the number 9. As may be understood from FIG. 6 the display is operated in a reflection mode, the bottom electrode R is a reflecting electrode, while the top electrode T is a transparent electrode (e.g. made out of tin oxide, indium-antimony oxide or indium oxide) and has been formed in the shape of the number 9. The reflecting electrode R may be formed on a supporting substrate S, which substrate may be for example glass, by being evaporated on the substrate and may be chosen from a group of materials including aluminum, gold, silver and combinations thereof. The transparent electrode T may be evaporated, sputtered or sprayed on the body of transparent material G which may be glass, rare earths, doped lead zirconate, lead titanate, ceramics, and any transparent single crystals. The application of an electric field (across a suitable body of aforementioned optically variable liquid, e.g. a nematic liquid crystal material M by closing the switch in FIG. 6) causes the material M immediately underneath the transparent electrode T to scatter incident light received through the body of transparent material G and the transparent electrode T, and hence provide a visible display forming the number 9.

The display of FIG. 6 can be used to provide the displays for the 7 segment numeric indicators of FIG. 1, the markers for the "seconds" in FIG. 2, and the markers of the "minutes" in FIG. 4 and the bargraph of FIG. 5.

It will be understood by those skilled in the art that the display of FIG. 6, operating in the reflecting mode as stated, provides two optically visible states as viewed looking downwardly in the direction of the arrows. By utilizing an optically variable liquid whose normal state is a transparent state, the reflecting electrode R will normally reflect incident light received through the body of transparent material G, the transparent electrode T and the transparent optically variable liquid M and thereby provide a first optically visible state. Upon the body of optically variable liquid material M being changed into the light scattering state by the application thereacross of a longitudinal electric field (longitudinal, i.e., with respect to the viewing direction as indicated by the arrows), the changed crystal material at least partially obscures the reflecting electrode and thereby provides a second optically visible state corresponding to the shape of the FIG. 9.

It will be appreciated that the display of FIG. 6 may be operated reversely, i.e., with the described first and second optically visible states reversed as to first and second states. Further, it will be appreciated that were the optically variable liquid M to be metallic dipole suspensions whose normal state is light scattering, the first optically visible state would be light scattering and upon the application of the electric field the metallic dipole suspensions would go into the transparent state thereby providing the second optically visible state. Still further, it will be appreciated that the terms "first optically visible state," and "second optically visible state," are arbitrary and relevant only with regard to the particular optically variable liquid used and the first or normal state desired or required.

Figure 13:
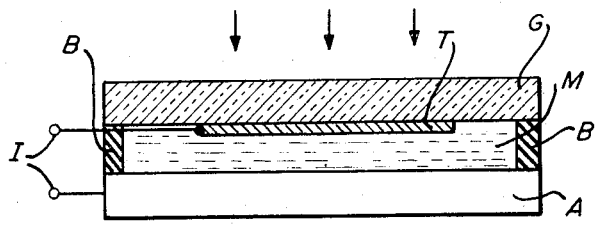
FIGS. 13 and 14 illustrate apparatus for providing a visible display according to the present invention and having at least two optically visible states, such display apparatus being useful with the chronometers of the present invention.

Alternate to the nematic liquid crystal display of FIG. 6, the displays of FIGS. 13, 14, 15, 16, 17, 18 and 19 may be utilized. Referring first to FIG. 13, the display shown is similar to that of FIG. 6 except that there is no reflecting electrode and the substrate S has been replaced with a body of electrically active material A which may be any material which can be used to make active devices. More particularly, the body of active material may be, by way of example, semiconductive material (e.g. silicon, germanium), non-linear dielectrics (e.g. ferroelectrics), non-linear magnetic materials (e.g. ferrites), and combinations of the foregoing, e.g. semiconductor-ferromagnetics, semiconductor-ferroelectrics, semiconductor-ferromagnetic-ferroelectric materials (e.g. ferrous sulfide).

The display of FIG. 13 also provides two optically visible states. When the body of optically variable liquid material M is such that its normal is the transparent state, the body of active material A reflects at least some incident light received through the body of transparent material, the transparent electrode T and the transparent optically variable liquid thereby provides a first optically visible state as viewed in the direction of the arrows. Upon the application of a suitable electric signal or pulse to the input means I, connected to the transparent electrode T and body of active material A, the electrode T and body of active material A establish a longitudinal electric field across the optically variable liquid M and cause the material to change into a light scattering state and scatter incident light received through the transparent material G, the transparent electrode T and thereby at least partially obscure the active material and provide a second optically visible state as viewed in the direction of the arrows. As noted above, should the optically variable liquid be metallic dipole suspensions, the transparent and light scattering states would be reversed.

Figure 14:
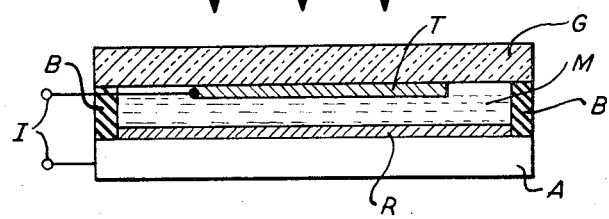

Referring now to FIG. 14, the display shown is similar to FIG. 13 but also utilizes the reflecting electrode which is in direct mechanical and electrical engagement with the body of active material and which may be formed directly on the body of active material by being evaporated directly thereon and may be chosen from a group of materials including aluminum, gold, silver or combinations thereof. The display embodiment of FIG. 14 operates in the above-described manner and provides two optically visible states. The signal input means I is connected to the transparent electrode T and body of active material A, and the input signal is applied to the transparent electrode T and body of active material A to establish an electric field across the body of optically variable liquid M and cause the liquid M to either change into a light scattering state or transparent state as described above. As will be set forth in detail infra, the body of semiconductive material may have an integrated circuit formed therein.

Figure 15:
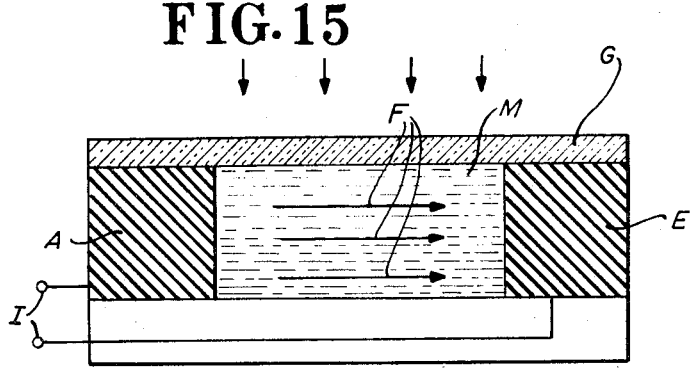
FIG. 15 illustrates apparatus for providing a visible display according to the present invention also having at least two optically visible states but utilizing a horizontal electric field.

Referring now to FIG. 15, there is shown a display wherein the predetermined electric field applied to the optically variable liquid M is a horizontal field, horizontal that is with respect to the viewing direction indicated by the arrows. Upon the application of a suitable signal to the input means I connected to the body of active material A and electrode E, a horizontal electric field will be established across the optically variable liquid M suitably sealed between the glass G and the reflecting means R.

Figure 17:
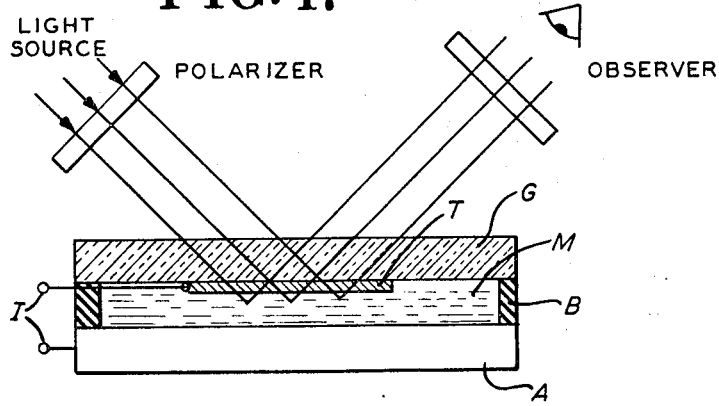
FIGS. 17 and 18 are similar to FIGS. 13 and 14 but show apparatus for providing a visible display according to the present invention wherein polarized light is utilized.
Figure 18:
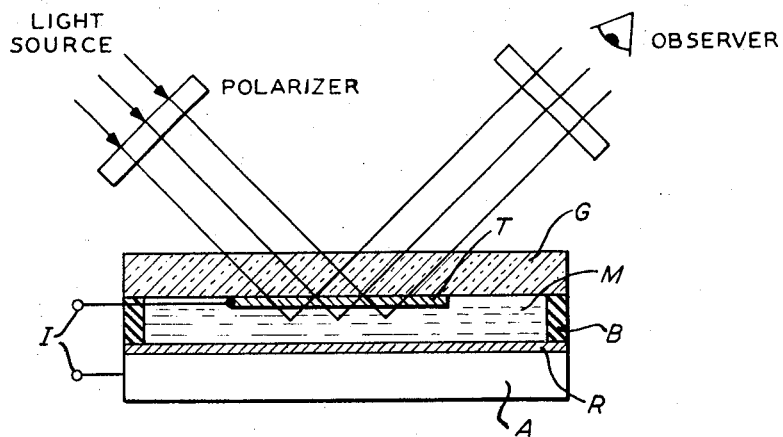
Figure 19:
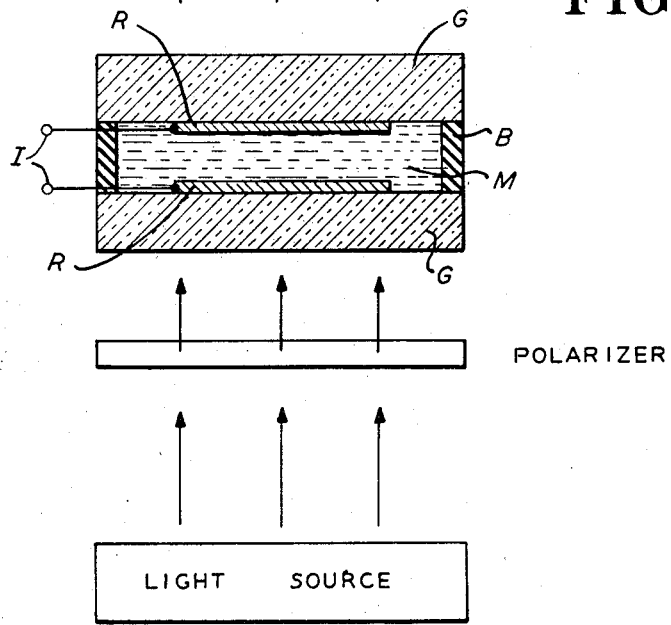
FIG. 19 is similar to FIGS. 17 and 18 but shows a visible display utilizing polarized light which is operated in the transmission mode.

Referring now to FIGS. 17 and 18, the optically variable liquid M may be a suitable electro-optic liquid which upon the application of an electric field undergoes a change in optical retardation or rotation which change is viewable in the presence of polarized light and a suitable light analyzer; the polarizer and analyzer being positioned at predetermined angles as shown to the light reflection indicated by the arrows. FIGS. 17 and 18 are similar to FIGS. 13 and 14 in that FIG. 18 differs from FIG. 17 by the addition of the reflecting electrode R. The display embodiments include either a source of polarized light or a light source and a polarizer and analyzer as shown. With the electric field removed or not applied to the electro-optic liquid M, a first optically visible state will be viewable through the analyzer, i.e., the polarized light will pass through the electro-optic liquid M, will be reflected by either the body of active material A of FIG. 17 or the reflecting electrode R of FIG. 18, and will provide a first optically visible condition or state viewable through the analyzer as shown. Upon the application of an electric field across the electro-optic liquid in response to a suitable input signal to the signal input means I, the electro-optic liquid will undergo the noted optical retardation or rotation and the body of active material A of FIG. 17 or relfecting electrode R of FIG. 18 will be at least partially obscured with respect to the polarized light and a second optical condition or state will be viewable through the analyzer. reflecting REferring now to FIG. 19, there is shown a display according to the present invention which is operable in the transmission mode, i.e., the first and second optically visible states are provided by the transmission, or preclusion of transmission at least in part, of light through the optically variable liquid M. Thus, with the optically variable liquid M in a transparent state, light will pass through the liquid M and will provide a first optically visible condition or state. Upon the optically variable liquid being in the light scattering state as described above, at least part of the light will be obscured and a second optically visible condition or state provided. If electro-optic liquid is utilized, polarized light or a source of light and a polarizer, and an analyzer would be utilized as shown.

In the displays, the body of optically variable liquid may be sealed between the electrodes, or between the transparent electrode and body of active material, by suitable sealing means B which must be electrically and chemically inert, for example, a suitable epoxy adhesive to the transparent material G and the reflecting electrode, substrate material S, or body of active material A. Alternatively, the seal could be accomplished by fritting with a low melting point glass.

If the individual or discrete displays of FIG. 6 are used for form the watch display of FIG. 1, then it is necessary to make 36 connections between the addressing circuitry and the transparent electrodes. For the embodiment of FIG. 2 84 connections are needed. For the complete embodiment of FIG. 4 (i.e., using all the shift registers shown in FIG. 3) 151 connections are needed.

Making such a large number of connections in a confined space, such as a watch is very difficult. When those connections have to be shock proof and 100 percent reliable, then the problem becomes extremely difficult.

A further teaching of the present invention overcomes these problems by removing the need to make discrete connections. In general, the further teaching includes the forming of the defining or reflecting electrodes as an integral part of the integrated semiconductor addressing circuits. The optically variable liquid is then placed on top of the electrodes and a "cover glass" with a common transparent sheet electrode in contact with the upper surface of the liquid crystal completes the display.

Figure 7:
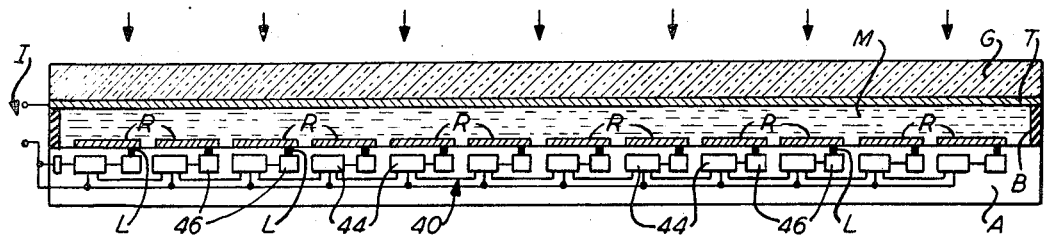
FIGS. 7 and 7A illustrate respectively side elevational and top views of a nematic liquid crystal display according to the present invention.

More particularly, the manner in which this further teaching can be used to form the bargraph of FIG. 5 is illustrated in FIG. 7. In FIG. 7 there is shown a body of electrically active material A (e.g. silicon or as is referred to in the art a silicon chip) having an integrated circuit formed therein, such as for example a multistage shift register circuit such as a 12 stage hour shift register indicated by the general numerical designation 40 and including a plurality (12 as shown) of stages 44. Also formed in the body of active material A are a plurality (12 as shown) of integrated drive or driver circuits of the type referred to above and identified by the numerical designations 46; each driver circuit as shown schematically, is electrically associated or interconnected with one of the stages 44 of the shift register 40. Formed directly on the upper surface of the body of active material A are a plurality of reflecting electrodes R which may be formed by being evaporated directly on such surface, and which may be chosen from a group of materials including aluminum, gold and silver. Provided intermediate the drive circuits 46 and reflecting electrodes R are a plurality of "lands" or "pads" L which, as understood by those skilled in the art, electrically interconnect the drive circuits and reflecting electrodes. Opposite the reflecting electrodes R is a common transparent sheet electrode T which is formed on the body of transparent material G, for example, by being sprayed, sputtered or evaporated on the transparent material. A body of optically variable liquid M is disposed between, and in intimate mechanical and electrical engagement with, the transparent electrode T and the plurality of reflecting electrodes R.

As may be noted from viewing FIG. 7, each reflecting electrode R is electrically associated with and interconnected to a drive circuit 46 by a land L and each drive circuit is electrically associated with or electrically connected to a shift register stage 44, and hence, such circuit components may be said to be "associated." It will also be noted that the signal input means I is electrically interconnected with the transparent electrode T and the body of active material A or, more particularly, to the integrated shift register circuit 40 formed in the body of active material. Thus, it will be understood that the transparent electrode T is electrically common to all of the reflecting electrodes R. The body of optically variable liquid M is suitably sealed between the transparent and reflecting electrodes by suitable sealing means B, such as for example, a suitable chemically and electrically inert epoxy, or, the seal may be accomplished by fritting with a low melting point glass, as stated hereinabove with regard to the displays of FIGS. 6, 13, and 14.

As noted above, the drive circuits may or may not be required depending upon the voltage level of the output signals provided by the stages of the shift register circuits and the voltage levels required to cause the body, or bodies, of optically variable liquid to change, e.g., from the transparent state to the light scattering state, which change of state is dependent upon the thickness and type of the optically variable liquid utilized.

Accordingly, it will be understood that it is within the contemplation of the present invention that embodiments of the present invention will both include and not include the drive circuits 46. For example, it is within the contemplation of the present invention, as shown in FIG. 7B, that the shift register stages 44 be directly electrically associated with or interconnected to the reflecting electrodes R by lands L in those embodiments wherein the signal output level of the shift register stage material M. Further, it will be understood by those skilled in the art, that embodiments of the present invention may not include the lands L and that the reflecting electrodes R may be formed directly on those portions of the body of active material A in which the shift register stages 44 are formed (as illustrated in FIG. 7C) or formed on those portions of the body of active material A in which the drive circuits 46 are formed (as illustrated in FIG. 7D).

Referring again to FIGS. 7–7D, it will be understood that the shift register stages 44 (FIGS. 7B–7C) and/or the drive circuits 46 (FIGS. 7 and 7D) are formed in predetermined portions of the body of active material A and may be formed in a predetermined geometric pattern. For example, rather than being formed in a linear geometric pattern as illustrated in FIG. 7, the shift register stages 44 and/or drive circuits 46 may be formed in the body of active material A in other geometric patterns, such as for example, circular, ellipsoidal, triangular, or virtually any other predetermined geometric pattern. Thus, it will be further understood, that the reflecting electrodes R would be formed in the same, or substantially the same geometric pattern as the shift register stages or drive circuits, and hence, the reflecting electrodes R would be formed on the body of active material overlying those portions of the body of active material A in which the shift register stages, and/or drive circuits would be formed in the body of active material.

Figure 16:
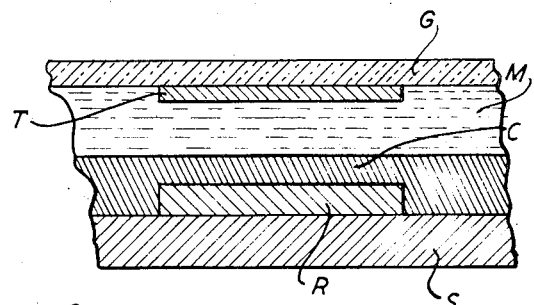
FIG. 16 is similar to FIG. 14 but shows the use of a protective coating for the reflecting electrode.

Referring specifically to the reflecting electrodes R, and to FIG. 16, if required or desired the electrode R may be provided with a coating of transparent material C for rendering the reflecting electrode chemically inert with respect to the optically variable liquid M. Such coating may be tin oxide, indium oxide, or indium-antimony oxide.

Figure 7D:
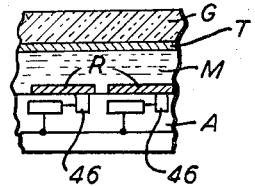
Figure 8:
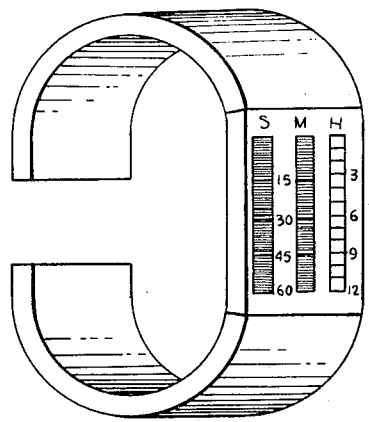
FIGS. 8, 9 and 10 are diagrammatic representations of chronometers or electronic watches embodying the present invention and illustrating the flexibility of design and structural configuration made possible by the teachings of the present invention.
Figure 9:
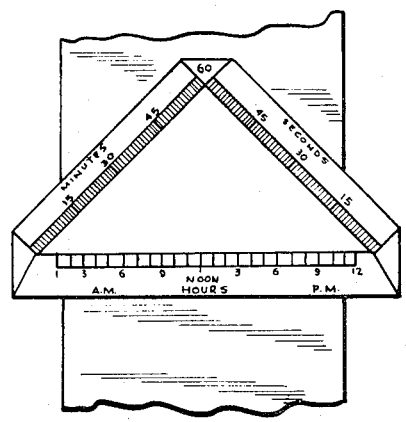
Figure 10:
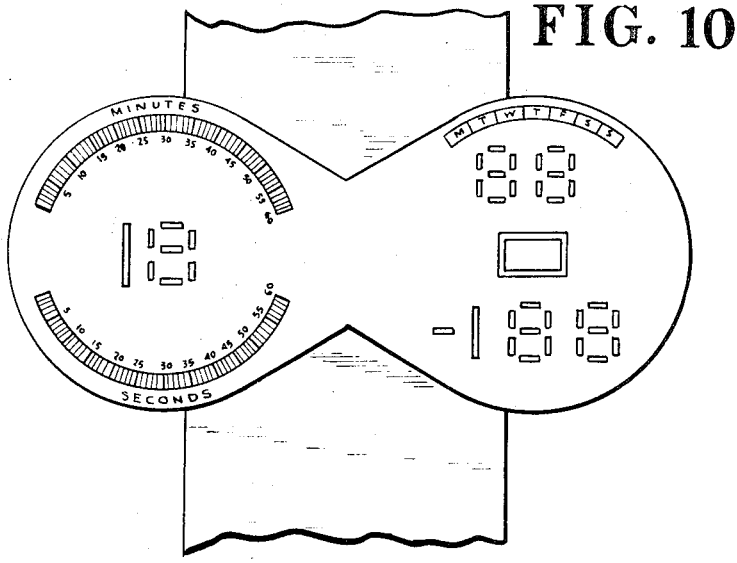

Accordingly, unlike mechanical or electrical motor watch movements, the chronometers or electronic watches embodying the present invention are not limited to a circular, or substantially circular, format or geometric configuration. In accordance with the teaching of the present invention, and in particular the immediately foregoing teaching illustrated in FIGS. 7–7D, there are virtually an infinite number of chronometer or watch display arrangements or geometric configurations possible—a few of which, by way of example, are illustrated in FIGS. 1, 2, 4 and 5, and in addition, FIG. 8 shows an embodiment of the present invention in which the chronometer or electronic watch is geometrically continuous with the watch band. In FIG. 8, the seconds, minutes, and hours are displayed in the form of bargraphs, such as illustrated in FIGS. 5 and 7. FIG. 9 illustrates a triangular geometric configuration of the watch display shown in row and column geometric configuration of FIG. 8. FIG. 10, illustrates a double ellipsoidal geometric configuration which may embody the teachings illustrated by FIGS. 5 and 7. One ellipsoid contains "second" and "minute" bargraph time readout displays, and an "hour" digital display. The other ellipsoid may contain the day and date, a paging indicator and a numeric temperature read out. In various large establishments, for example hospitals, it is important to be able to page or indicate to people that they are required, for example to answer a telephone. In the past this has been done typically by placing on the person a small radio receiver with an audio output of some distinctive tone or tune. The present inexpensiveness and smallness of integrated circuits allow the receiver to be built into the watch case and the liquid crystal display to be used as a video output whenever the paging occurs. To attact attention, the paging visible display would be structured to turn on and off at an eye catching rate. The antenna for the receiver can be conveniently built into or formed by the watch band.

In some instances, it may be desirable as noted hereinabove, to provide a visible display for displaying temperature. The temperature displayed could be the temperature of either a central point or at the locale or a person. In the former, information would be transmitted by radio signals, picked up by the integrated circuits and then displayed on a liquid crystal read out. In the latter situation, the temperature sensing mechanism could be built into the watch case. The information derived from the temperature sensing device (in most such devices it would be analog in nature) would then be processed (for example amplified and possibly digitized) into such a form as to activate a suitable liquid display structured in accordance with the teaching of the present invention. The possible additional features of paging and temperature read-out display as illustrated by the embodiment of FIG. 10 are merely representative and not all inclusive.

HIGH VOLTAGE OPERATION

In the embodiments of the invention described above, the output signals provided by the stages of the shift register circuits, or the drive circuits, were compatible with the activated optically variable liquid, i.e., were sufficiently great to cause the optically variable liquid to change states. It is, however, within the contemplation of the present invention to utilize higher voltage (e.g. 50 volts) optically variable liquids and/or lower voltage addressing or logic circuits (e.g. 1.5 volts). With such voltage incompatibility it is necessary to provide intermediate high voltage driving circuits intermediate the addressing or logic means and the optically variable liquid. Circuitry or structure for providing the higher voltages may include:

1. Transformers—these could be conventional transformers with multiple windings—or in the alternative, piezoelectric transformers which have no windings such as those used to generate the plate voltage for TV tubes.

2. High voltage electronic drivers—these, of course, require a battery of the appropriate voltage. Depending upon the voltage required, the high voltage drivers may be built with integrated circuitry or may require discrete transistors.

3. Voltage double circuits made up of capacitors and diodes. Such circuits are well known to those skilled in the art and can be used to double, triple, guadruple, etc., the amplitude of alternating voltage.

If discrete transformers or transistors are used there is a great advantage in reducing the number of driving circuits required. In accordance with the teaching of the present invention, one manner of achieving such reduction is to address the display with a diode matrix such as those shown in FIGS. 11A and 11B.

Figure 11A:
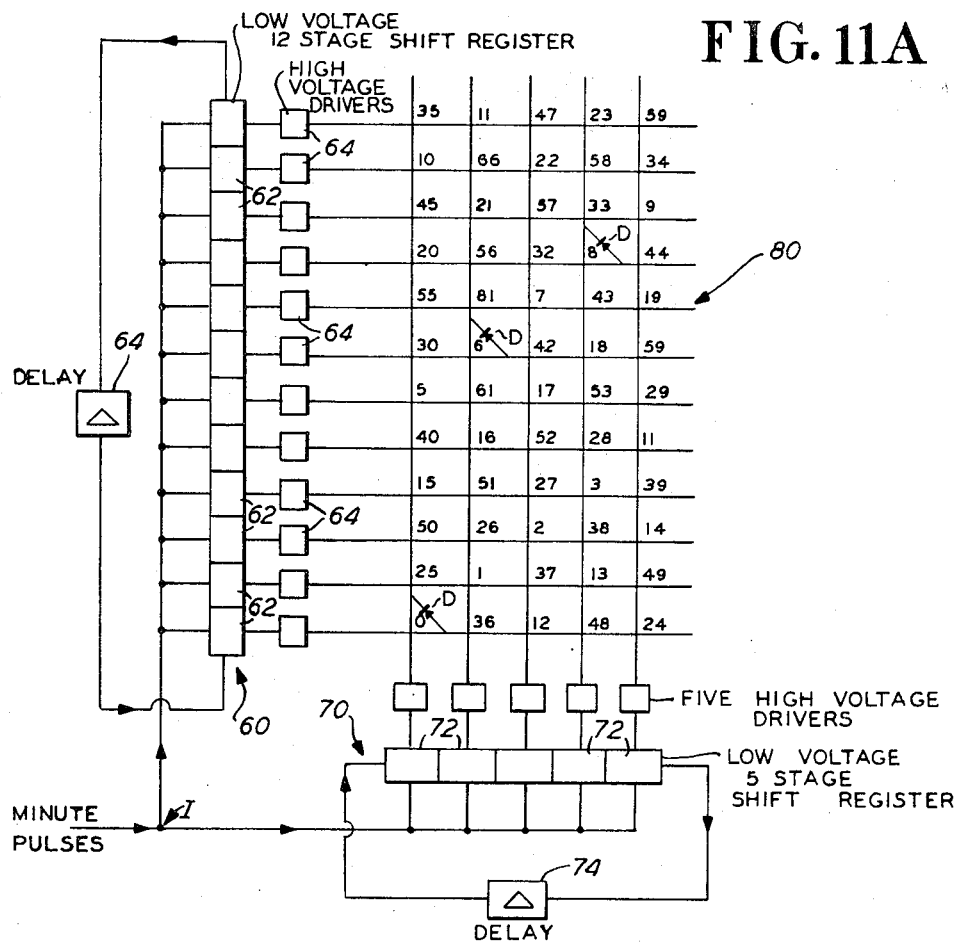
FIGS. 11A and 11B are schematic representations of diode matrices which may be used as addressing means for various nematic liquid crystal displays of the present invention.

In the embodiment of FIG. 11A, there are two multi-stage low voltage shift registers indicated by general numerical designations 60 and 70.

The shift register 60 includes 12 stages 62 with the output of the last stage being interconnected with the first stage by delay means 64 for applying the output of the last stage delayed by a small predetermined amount of delay to the first stage as input pulses to the shift register 60. Similarly, the last stage of the shift register 70 is interconnected by suitable delay means 74 to the first stage of shift register 70 and the output of the last stage is applied to the first stage, delayed by a small predetermined amount of delay, as input pulses to shift register 70; shift register 70 including 5 stages 72 as shown; such delays preventing premature shifting of the shift register stages.

Signal input means indicated generally by alphabetical designation I receives input pulses, for example, pulses from a counter 12 of FIG. 3 or output pulses from the last stage of a preceding shift register such as in the teaching of FIG. 3, and such input pulses are applied simultaneously and in parallel to all the stages of both shift registers 60 and 70, as shown, as shift pulses for the respective shift registers.

A diode matrix, indicated by the general numerical designation 80 includes a plurality (60 in the embodiment of FIG. 11A) of high voltage diodes (indicated representatively by the diodes indentified by alphabetical designation D) and which diodes may be any one of several known to those skilled in the art. The diodes are arranged in rows equal to the number of stages of shift register 60 and arranged in columns equal in number to the stages of the shift register 70. Intermediate the respective shift register stages and the rows and columns of the diode matrix 80 are high voltage drivers 64 or driver circuits such as those referred to hereinabove with regard to FIGS. 3, 5 and 7. The high voltage drivers receive the output signals from their respectively associated shift register stages and amplify such signals and apply the amplified signals in parallel to the diodes of the respective rows and columns of the diode matrix 80. Upon the coincidence of an output signal from a stage of shift register 60 and a signal from a stage and driver of shift register 70 at a diode in the matrix, the diode is activated to provide a high voltage output signal which is applied to an optically variable liquid display, such as for example the display of FIG. 6 to cause the crystal material to change state.

Initially, a binary "1" is placed in the first stage of each shift register 60 and 70 and, as described with regard to the shift registers shown in FIG. 3, the "1"s are advanced sequentially through the shift register stages to cause the shift register stages to apply sequentially occurring output signals to their respectively associated high voltage drivers which in turn apply such output signals sequentially in parallel to the diodes in the respective rows and columns. The matrix is structured such that such output signal coincidence will occur only at a single diode upon the application of an output signal to a row and a column of the matrix, but upon the sequential application of output signals to the matrix rows and columns the diode matrix will provide sixty sequentially occurring high voltage output signals which will occur in a predetermined sequence as indicated by the numerical designations 0-59. Such sequential output signals, for example, may be used to address or activate the 60 discrete "minutes" markers of FIG. 4, or could be used to address a common transparent electrode T and 60 reflecting electrodes R of an embodiment of the types shown in FIGS. 7-7D.

Figure 11B:
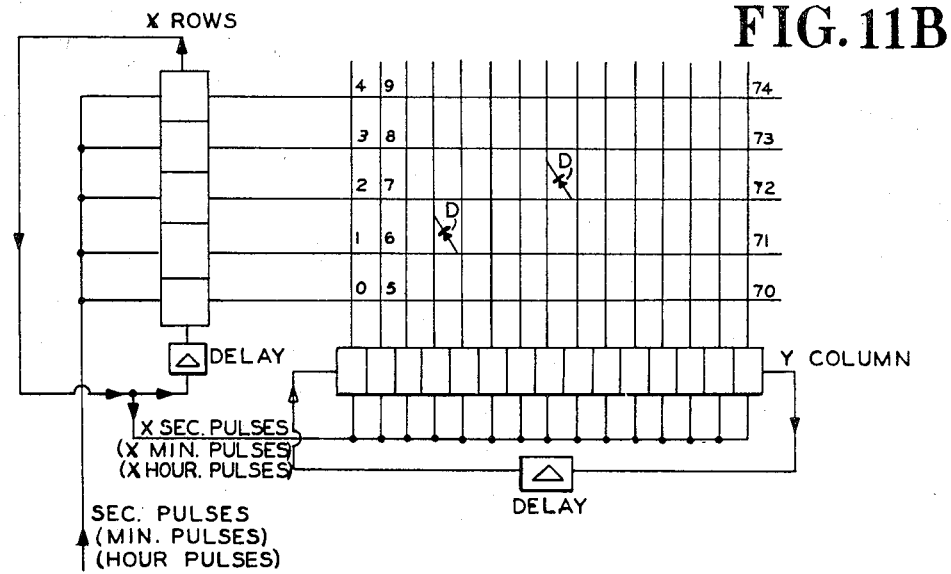

The high voltage diode matrix of FIG. 11B is similar to that of FIG. 11A except for the important advantage that this matrix produces sequentially occurring output signals which occur in columnar sequence as indicated by the numerical designations. This is achieved by using the output from the last stage of the row shift register as the source of the shift pulses for the column shift register. A columnar sequence is achieved in FIG. 11B and is to be preferred over the diagonal type sequence achieved in FIG. 11A since it provides a more logical geometrical configuration for driver circuits if used.

It will be understood by those skilled in the art that other matrices of R rows and C columns may be used in the practice of the present invention, however, for proper operation the following conditions should be met:

a. R × C must equal the number of counting steps required.

b. R must not equal C c. R and C must not have common factors other than 1.

In brief review, the important advantage of the scanning matrix of FIGS. 11A and 11B is that 60 high voltage outputs can be achieved with only (5 + 12) or seventeen high voltage driving circuits, e.g, driving circuits 64, the high voltage drivers could be discrete transistors or transformers as noted above.

Figure 12:
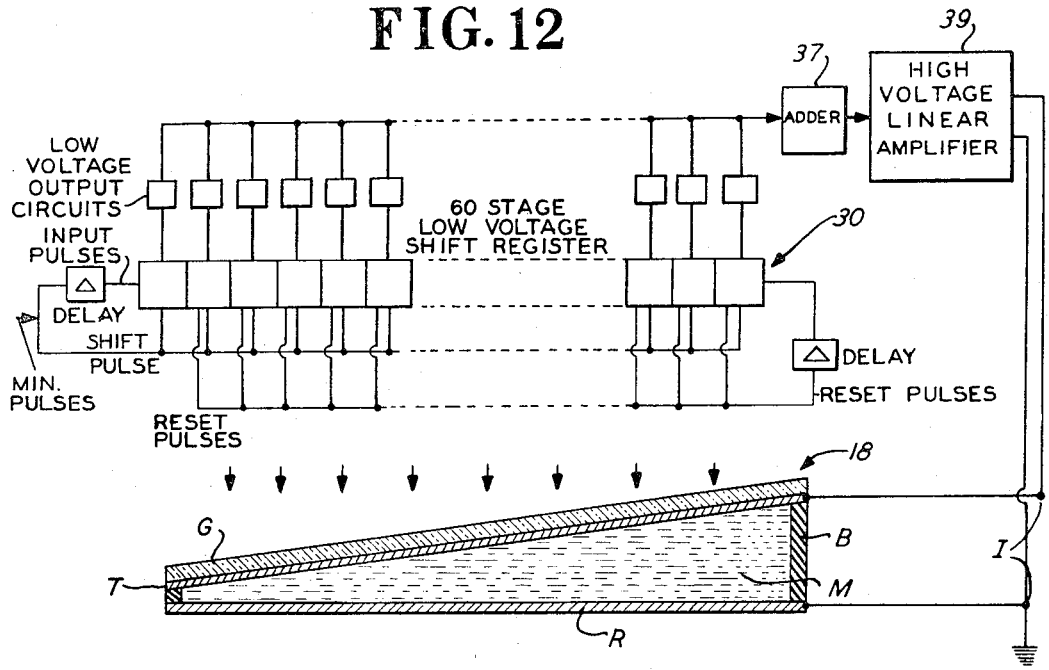
FIGS. 12 and 12A illustrate display apparatus or chronometer according to the present invention wherein the nematic liquid crystal display is provided with portions of varying thickness which portions are activated sequentially to provide a visible display.
Figure 12A:
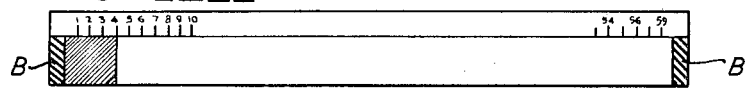

As explained above, matrix addressing is an economical method of reducing the number of high voltage driving circuits. An even greater reduction can be obtained if the display, e.g., chronometer or watch display, requires only an analog rather than a digital output. FIG. 12 illustrates how a sixty minute display for example, can be obtained using only one high voltage driver.

In FIG. 12 the 60 stage shift register 30 may be used to count the minutes for a chronometer or watch display 30 and is structured to retain the information in the stages the same way as that used for the 12 stage shift register of FIG. 5. The outputs from each stage are added by an adder 37 and fed into the input of a linear amplifier 39 which acts as the high voltage driver. The input to the amplifier will vary from 1 to 60 units in 60 equal steps (i.e., a pedestal or step-by-step input waveform) according to the number of elapsed minutes. The output from the amplifier, which will vary in 60 equal steps, is applied to the electrodes (transparent electrode T and reflecting electrode R) of the minute optically variable liquid display 18. Because the optically variable liquid display has an analog read-out it has a somewhat different form to that described earlier. As shown in FIG. 12 the display varies in thickness, the transparent electrode T is disposed at a predetermined angle with the reflecting electrode R so as to provide the body of optically variable liquid M with increasingly thicker portions. When the lowest voltage (i.e., one amplified unit) is applied to the electrodes through the signal input means I, then only the thinnest region of the optically variable liquid receives enough electric field to be activated (i.e., put into a light scattering condition). As more and more voltage is applied to the resistance electrodes (i.e., as more and more minutes elapse in the hour) progressively more and more of the display is activated. In other words, the leading edge of the scattering is used as a bargraph indicator of time. The voltage versus light scattering characteristic of the optically variable liquid is such that the scattering tends to saturate at a certain voltage. As a result, the display will tend to have uniform amount of scattering along its length even when the largest voltage (equivalent to 60 minutes) is applied to the electrodes.

Unlike the previous displays, the embodiment of FIG. 12 because it is analog, is basically inexact. The degree of accuracy which can be obtained is a function of the linearity of the high voltage amplifier and the accuracy with which the variable thickness display can be constructed. Obviously, the more steps that have to be distinguished the greater the tolerance problems. Hence a 60 second or a 60 minute display is more difficult to construct than a 12 hour display. On the other hand many people, and hence many watches (for example a "jewelry" watch for a lady) do not require "digital" accuracy in reading the minutes and the seconds. To be able to read within plus or minus a time unit is quite satisfactory.

The electrodes R and T of FIG. 12 are uniform resistance electrodes, and as an alternative to such uniform resistance electrodes, and variable thickness optically variable liquid display of FIG. 12, a variable resistance electrode and uniform thickness optically variable liquid can be used. By varying the resistance in a linear fashion it is possible to cause the leading edge of the scattering to progress along the display as the applied voltage is increased. It is particularly convenient to vary the resistance of the transparent electrode T rather than the resistance of the reflecting electrode R.

Alternative circuitry may also be employed for the electronics shown in FIG. 12. For example, instead of adding the 60 outputs of the shift register, the "weighted" outputs of 6 flip flops can be added to form the input to the high voltage amplifier. The six flip flops are arranged to count single (1) minutes, 2 minutes, 4 minutes, 8 minutes, 16 minutes, 32 minutes. The outputs of the flip flops are arranged so that the "2 minute" flip flop gives twice the output of the "1 minute" flip flop and so on. If the low voltage integrated electronics is suitably designed then it is possible with the 6 flip flops to "count" every minute between 1 and 60 and obtain a "summed" voltage proportional in amplitude to the number of minutes that have elapsed.

Another alternative for obtaining a high voltage output is to use a miniature stepping motor. The motor, driven under the control of the appropriate low voltage integrated electronic counters, is used to rotate the rotor of a switch. The stator of the switch consists of the appropriate number of contacts (60 in the case of a "minute" display). The high voltage is applied to the rotor and is transferred to the stator contacts in turn as the motor is stepped at "minute" intervals. The stator contacts are connected appropriately to the optically variable liquid display. The rotor-stator contacts can be resistive. It is preferable however to make them capacitive since this virtually avoids mechanical friction and hence reduces the size of stepping motor needed. Capacitive coupling implies that the high voltage be ac rather than dc. Alternating voltage is preferable since it enhances the lifetime of the optically variable liquid display.

Figure 7A:
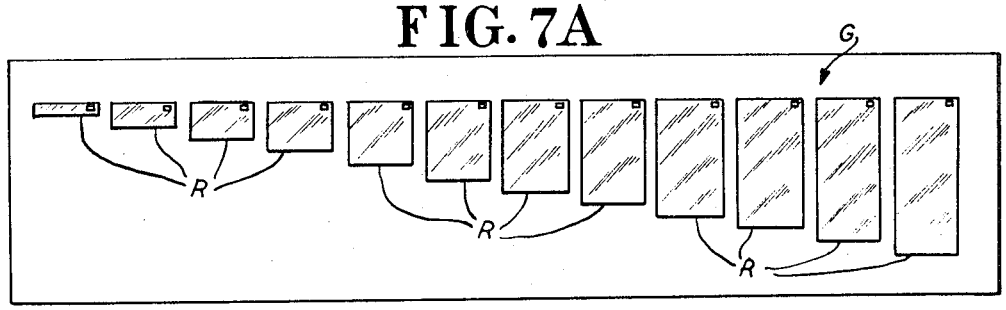
Figure 7B:
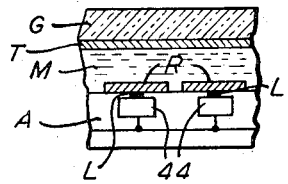
FIGS. 7B-7D are fragmentary views illustrating alternative embodiments of FIGS. 7 and 7A.
Figure 7C:
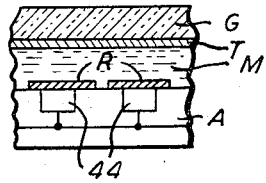
Figure 20:
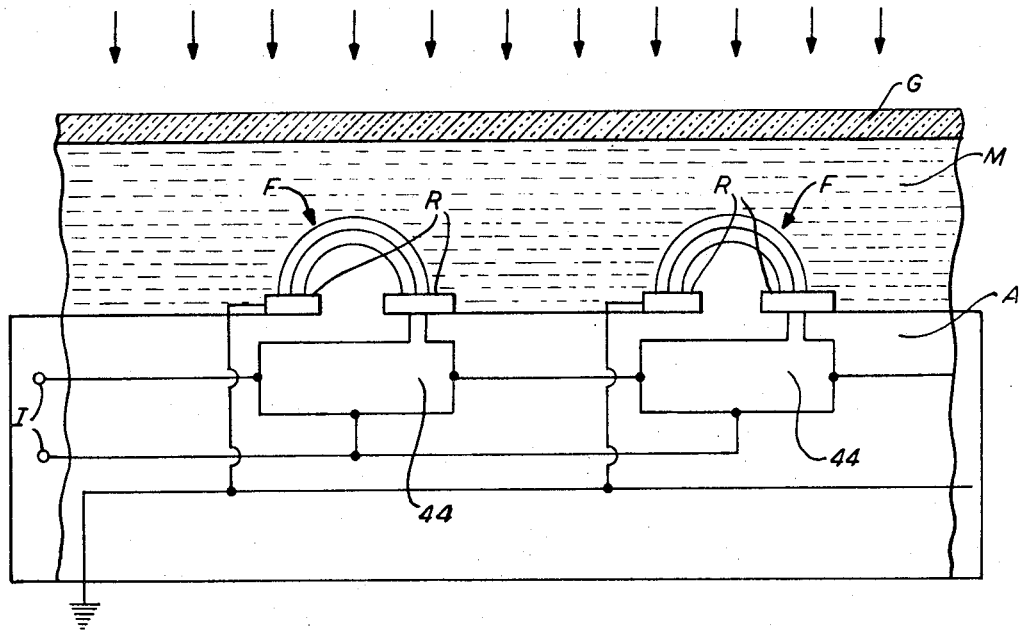
FIG. 20 is a further embodiment of the present invention but illustrating the utilization of fringe switching.

Referring now to FIG. 20, there is shown a partial view of structure according to the present invention which provides, inter alia, an alternate embodiment to FIG. 7A and its alternate geometrical configurations (FIGS. 8, 9 and 10) as described above, or an alternate embodiment to the display apparatus of FIGS. 6, 13, 14 et al.

The embodiment of FIG. 20 utilizes fringe switching to establish an electric field F across a predetermined portion of the body of optically variable liquid M. At least two or a pair of reflecting electrodes are required to provide fringe switching, and with regard to fringe switching, it will be understood that with respect to the direction of viewing as indicated by the arrows, the primary field direction is transverse. Upon the establishment of a difference in electrical potential between the reflecting electrodes of a pair thereof, an electrical field F is established across at least that portion of the optically variable liquid in engagement with and above the pair of reflecting electrodes, and will cause that portion of optically variable liquid to either to into a light scattering state, or transparent stage depending upon the specific optically variable liquid utilized as taught above, and thereby provide a second optically visible state viewable in the direction of the arrows; such portion of optically variable liquid providing a first optically visible state in the normal condition (transparent or light scattering as taught above) which the liquid will assume with the field removed.

As shown in FIG. 20, the body of active material may have at least one integrated circuit formed therein, or as the embodiment of FIG. 7A may have a multi-stage shift register circuit (or plurality thereof) formed therein, including or not including drive circuits, and including or not including lands, as taught above.

In the partial view of FIG. 20, there are shown two pairs of reflecting electrodes with one electrode of each pair being connected to ground or circuit common, and the other reflecting electrode of each pair being electrically associated with one of the integrated circuits or stages of a shift register. Upon the shift registers being activated in a predetermined sequence, for example as related to time (seconds, minutes, hours, etc.) as taught above with regard to FIG. 7A, the reflecting electrodes will establish the electric fieldsF in a predetermined sequence by fringe switching, nd the respective portions of the optically variable liquid in engagement with and above the respective pairs of reflecting electrodes will be sequentially changed into a light scattering, or transparent state depending upon the specific optically variable liquid used, and hence at least two optically visible states (indicative of, for example, time, i.e., seconds, minutes, hours, etc.) will be provided above each pair of reflecting electrodes viewable in the direction of the arrows.

It will be understood that when a plurality of pairs of reflecting electrodes are utilized with a common layer of optically variable liquid as shown in FIG. 20, that the intensity of the fields F established by such fringe switching, and the thickness of the layer of optically variable liquid M, will be chosen such that only a relatively discrete portion of such liquid will be caused to change optical state, and hence, such a common layer of optically variable liquid may be utilized to provide a plurality of optically visible displays at different physical locations, and with each such display having at least two optically visible states.

Figure 21A:
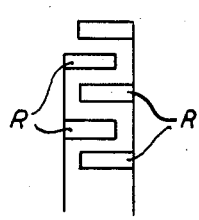
FIGS. 21A and B illustrate electrode configurations in accordance with the present invention which electrodes are particularly useful with the embodiment of FIG. 20.
Figure 21B:
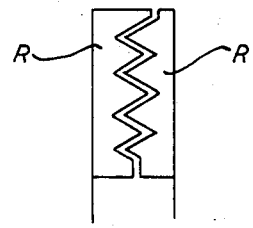

In order to maximize the establishment of the fields by fringe switching, the pairs of reflecting electrodes may be provided with complementary interleaved portions, as shown in FIG. 21, for maximizing the perimeter to area ratio of the interleaved electrodes.

It will be appreciated by those skilled in the art that the above-described embodiments are merely illustra-

What is claimed is:

1. A chronometer for providing a visible display indicative of time, comprising: a first optically visible state,
   display means including at least one body of optically variable liquid in a first optically visible state, a reflecting electrode, and a transparent electrode disposed a predetermined distance from and at a predetermined angle with respect to said reflecting electrode, said body of optically variable liquid disposed between and in engagement with said electrodes whereby said body of optically variable liquid is provided with portions of varying thickness;
   means for providing pulses at a predetermined frequency related to said time; and
   means for receiving said pulses and for converting said pulses into drive signals at a predetermined frequency related to said time and for applying said drive signals to said electrodes whereby longitudinal electric fields are developed and applied by said electrodes to said body of optically variable liquid to cause said body of optically variable liquid to change periodically from said first optically visible state to a second optically visible state and periodically reflect received incident light and provide said visible display indicative of time.

2. A chronometer for providing a visible display indicative of time, comprising:
   means for providing pulses at a first predetermined frequency related to said time;
   display means including a plurality of bodies of optically variable liquid arranged in a predetermined manner, said bodies of optically variable liquid normally in a first optically visible state; and
   means for receiving said pulses at said first predetermined frequency and for converting said pulses into drive signals at a second predetermined frequency indicative of said time and for developing from said drive signals predetermined electric fields occurring at said second predetermined frequency and for selectively applying said electric fields across said bodies of optically variable liquid at said second predetermined frequency from said first optically visible state to a second optically visible state and thereby provide said visible display indicative of time.

3. Apparatus according to claim 2 wherein said plurality of bodies of optically variable liquid are arranged and configured in a predetermined manner to provide a digital display, and wherein said last recited means includes a binary-to-digital converter.

4. Apparatus according to claim 2 wherein said plurality of bodies of optically variable liquid are arranged and configured in a predetermined manner to provide an analog-digital display, and wereein said means for receiving and converting said pulses includes a binary-to-decimal converter.

5. A chronometer according to claim 2 wherein said last recited means includes a shift register including a plurality of stages wherein predetermined ones of said plurality of stages are interconnected with predetermined ones of said plurality of bodies of optically variable liquid, and wherein said last recited means further includes delay means interconnected between the first and last stages of said shift register and for applying the output of the last stage to the first stage delayed by a predetermined amount of delay, said shift register for receiving said pulses at said predetermined frequency and upon the receipt of said pulses, said predetermined ones of said shift register stages provide output signals which comprise said drive signals.

6. A chronometer according to claim 2 wherein said last recited means includes a driver connected between each body of optically variable liquid and the shift register stage to which the body of optically variable liquid is connected, each of said drivers for receiving the output signal of the shift register stage to whcih it is connected and for amplifying said output signal and wherein said electric fields are developed from said amplified output signals.

7. Apparatus according to claim 2 wherein said first optically visible state is a transparent state and said second optically visible state is a light scattering state.

8. Apparatus according to claim 2 wherein said first optically visible state is a light scattering state and said second optically visible state is a transparent state.

9. A chronometer according to claim 2 wherein said last recited means includes:
   a first voltage low voltage shift register including a predetermined number of stages;
   first delay means interconnecting the last and first stages of said first shift register and for the output of said last stage to the input of said first stage delayed by a predetermined amount of delay;
   a first plurality of high voltage drivers, the input of each of said drivers interconnected with the output of a predetermined stage of said first shift register;
   a second low voltage shift register including a predetermined number of stages;
   second delay means interconnecting the last and first stages of said second shift register and for applying the output of said last stage to the input of said first stage delayed by a predetermined amount of delay;
   a second plurality of high voltage drivers, the input of each of said drivers interconnected with the output of a predetermined stage of said second shift register;
   a plurality of high voltage diodes, said diodes arranged in a matrix having rows equal in number to said first plurality of high voltage drivers and having columns equal in number to said second plurality of high voltage drivers;
   the output of each of said high voltage drivers of said first plurality of high voltage drivers being applied to the high voltage diodes in a predetermined row of said matrix;
   the output of each of said high voltage drivers of said second plurality of high voltage drivers applied to the diodes in a predetermined column of said matrix;
   signal input means for receiving said pulses at said predetermined frequency and for applying said pulses as shift pulses simultaneously in parallel to all the stages of said first and said second low voltage shift registers; and
   upon each of said shift registers receiving said shift pulses and upon the output of the last stage of each respective shift register being applied to the first stage of each respective shift register by said respective delay means, said stages of said respective shift registers being activated sequentially and applying low voltage output signals sequentially to their respectively interconnected drivers and said drivers amplifying said low voltage signals to high voltage signals and applying said high voltage signals sequentially to said respectively interconnected rows and columns of said diode matrix, and upon the sequential coincidence of a high voltage signal from said first plurality of drivers with a high voltage signal from said second plurality of drivers at each of said high voltage diodes said diodes being activated in a predetermined sequence to provide said drive signals.

10. A chronometer for providing a plurality of visible displays indicative of a plurality of units of time, comprising:

a plurality of time read-out displays equal in number to said plurality of units of time and each of said displays for providing a visible display indicative of one of said units of time, and each of said displays including a plurality of bodies of optically variable liquid arranged in a predetermined manner and normally in a first optically visible state;

time standard means for providing pulses at a predetermined frequency;

counter means for receiving said pulses and for converting said pulses into a plurality of trains of time pulses with each of said trains of time pulses being at a different predetermined frequency and related to one of said units of time; and addressing means for receiving said plurality of trains of time pulses and for converting said trains of time pulses into respective trains of drive signals at respective frequencies the same as that of the respective trains of time pulses from which said drive signals are converted, and said addressing means for applying said trains of drive signals to respective predetermined time read-out displays to cause said bodies of optically variable liquid of each of said respective time read-out displays to change from said first optically visible state into a second optically visible state in a predetermined sequence and at a frequency the same as that of the respective drive signals applied thereto and to cause said changed bodies of optically variable liquid to provide one of said plurality of visible displays indicative of one of said units of time.

11. Apparatus according to claim 10 wherein said plurality of bodies of optically variable liquid of each of said time read-out displays are arranged in a predetermined manner to provide a digital display, and wherein said addressing means for receiving said plurality of trains of time pulses includes a plurality of binary-to-digital converters.

12. Apparatus according to claim 10 wherein said plurality of bodies of optically variable liquid of each of said time read-out displays are arranged and configured in a predetermined manner to provide an analog-digital display, and wherein said addressing means for receiving said plurality of trains of time pulses includes a binary-to-decimal converter.

13. Apparatus according to claim 10 wherein said first optically visible state is a transparent state and said second optically visible state is a light scattering state.

14. Apparatus according to claim 10 wherein said first optically visible state is a light scattering state and said second optically visible state is a transparent state.

15. A chronometer for providing a plurality of visible time read-out displays, indicative of a plurality of units of time, comprising:

means for providing pulses at a predetermined frequency;

means providing a first shift register including a first predetermined number of stages and first delay means interconnected between the last and first stages of said shift register, said first delay means for applying the output of said last stage delayed by a first predetermined amount of delay to said first stage as input pulses for said first shift register, all of said stages of said first shift register for receiving in parallel said pulses at said predetermined frequency which received pulses act as shift pulses for said first shift register;

a first time read-out display including a plurality of bodies of optically variable liquid arranged in a predetermined configuration, said bodies of optically variable liquid normally in a first optically visible state;

predetermined ones of said stages of said first shift register electrically interconnected with said first time read-out display and said predetermined stages of said first shift register, upon the occurrence of said shift pulses and said input pulses for providing first drive signals to said first time read-out display to cause predetermined ones of said bodies of optically variable liquid to change from said first optically visible state to a second optically visible state in a first predetermined manner and thereby provide a first visible time read-out display indicative of one of said units of time;

means providing a second shift register including a second predetermined number of stages and second delay means interconnected between the last and first stages of said shift register, said second delay means for applying the output of said last stage delayed by a second predetermined amount of delay in said first stage as input pulses for said second shift register, all of said stages of said second shift register interconnected with the last stage of said first shift register and for receiving in parallel pulses from said last stage of said first shift register which received pulses act as shift pulses for said second shift register;

a second time read-out display including a plurality of bodies of optically variable liquid arranged in a predetermined configuration, said bodies of optically variable liquid normally in a transparent state; and predetermined ones of said stages of said second shift register being electrically interconnected with said second time read-out display and said predetermined stages of said second shift register, upon the occurrence of said shift pulses and said input pulses, for providing second drive signals to said second time read-out display to cause predetermined ones of said bodies of optically variable liquid to change from said first optically visible state to a second optically visible state in a second predetermined manner and thereby provide a second visible time read-out display indicative of another of said units of time.

16. A chronometer for providing a sequentially varying visible display having at least one sequentially varying optically visible state indicative of time, comprising:

means for providing electrical pulses at a predetermined frequency related to said time;

a body of semiconductive material having at least one integrated shift register circuit including a plurality of stages formed therein;

a delay circuit, said delay circuit interconnecting the last stage with the first stage of said shift register and for applying the output of said last stage delayed by a predetermined amount of delay to said first stage as input pulses for said shift register;

a plurality of reflecting electrodes formed on said body of semiconductive material with each reflecting electrode electrically associated with a predetermined one of said shift register stages;

a body of transparent material;

a transparent electrode formed on said body of transparent material and said transparent electrode being electrically common to all of said reflecting electrodes;

said body of transparent material being positioned in opposed, predetermined spaced relationship with respect to said body of semiconductive material, and said transparent electrode being positioned in opposed predetermined spaced relationship with respect to said reflecting electrodes;

a body of optically variable liquid disposed between, and in intimate mechanical and electrical engagement with said common transparent electrode and all of said reflecting electrodes, said optically variable liquid normally in a first optically visible state;

means for sealing said body of optically variable liquid between said transparent electrode and said reflecting electrodes;

means electrically associated with said transparent electrode and said body of semiconductive material and for receiving said electrical pulses at said predetermined frequency and for applying said pulses to said common transparent electrode and in parallel to all of said stages of said shift register as shift pulses;

upon the occurrence of said input pulses and said shift pulses, said shift register stages being activated sequentially at said predetermined frequency to provide first predetermined signals at said predetermined frequency and upon said first predetermined signals being applied sequentially to said transparent electrode and to said reflecting electrodes, said transparent and said reflecting electrodes establishing predetermined electric fields sequentially at said predetermined frequency across predetermined portions of said optically variable liquid positioned between said transparent electrode and said reflecting electrodes to which said first predetermined signals are applied to cause said predetermined portions of said optically variable liquid to change sequentially at said predetermined frequency from said first optically visible state to a second optically visible state and thereby provide a sequentially varying second optically visible state indicative of time.

17. A chronometer according to claim 16 wherein said stages of said integrated shift register are formed in predetermined portions of said body of semiconductive material in a predetermined geometric pattern and wherein said reflecting electrodes are formed on said body of semiconductive material in substantially said same predetermined geometric pattern and wherein said reflecting electrodes are electrically associated with said stages by being formed on said body of semiconductive material in direct mechanical and electrical contact with said predetermined portions of said body of semi-conductive material having said stages formed therein.

18. Apparatus according to claim 16 wherein said transparent electrode is evaporated, sputtered or sprayed directly on said body of transparent material and said transparent electrode is chosen from a group of materials consisting of tin oxide, indium oxide and indium-antimony oxide.

19. Apparatus according to claim 16 wherein said body of transparent material is glass.

20. A chronometer according to claim 16 wherein said reflecting electrodes are formed on said body of semiconductive material in a predetermined geometric pattern and wherein said chronometer further includes a plurality of lands provided on said body of semiconductive material intermediate said shfit register stages and said reflecting electrodes and for electrically associating said shift register stages with said reflecting electrodes.

21. A chronometer according to claim 16 wherein said reflecting electrodes are provided in predetermined physical configurations.

22. A chronometer according to claim 16 wherein said second optically visible state is a light scattering state and wherein reflecting electrodes have predetermined normally visible indicia formed therein which indicia are obscured by said portions of optically variable liquid when in said light scattering state.

23. A chronometer according to claim 16 wherein said means for providing said electrical pulses at said predetermined frequency includes a piezoelectric crystal oscillator for providing electrical pulses at a frequency higher than said predetermined frequency and a counter for receiving said pulses at said higher frequency and for counting said pulses down to said predetermined frequency.

24. Apparatus according to claim 16 further comprising:

a plurality of integrated drive circuits, formed in said body of semiconductive material, each drive circuit interconnected between one of said shift register stages and the reflecting electrode electrically associated therewith, said drive circuits for receiving said first predetermined signals and for amplifying said first predetermined signals into second predetermined signals; and wherein said second predetermined signals are applied sequentially to said transparent electrode and said reflecting electrodes to establish said longitudinal electric fields.

25. Apparatus according to claim 16 wherein said reflecting electrodes are formed in said body of semiconductive material by being evaporated directly on said body of active material and wherein said reflecting electrodes are chosen from a group of materials consisting of aluminum, gold, silver and combinations thereof.

26. Apparatus according to claim 25 wherein each of said reflecting electrodes further includes a transparent coating for rendering said reflecting electrodes chemically inert with respect to said body of optically variable liquid.

27. Apparatus according to claim 26 wherein said coating is chosen from a group of materials consisting of tin oxide, indium oxide and indium-antimony oxide.

28. Apparatus according to claim 16 wherein said predetermined electric fields are longitudinal electric fields.

29. Apparatus according to claim 16 wherein said body of optically variable liquid is mesomorphic matter.

30. Apparatus according to claim 16 wherein said mesomorphic matter is nematic liquid crystal material.

31. Apparatus according to claim 16 wherein said mesomorphic matter is smectic liquid crystal material.

32. Apparatus according to claim 16 wherein said mesomorphic matter is cholesteric material and wherein upon said application of said first predetermined signals to said transparent electrode and said reflecting electrodes, said electrodes produce heat which heat causes predetermined portions of said cholesteric material to change into a predetermined color and thereby provide said second optically visible state.

33. Apparatus according to claim 30 wherein said nematic liquid crystal material includes a predetermined dye molecule and wherein upon the establishment of said predetermined electric fields across predetermined portions of said nematic liquid crystal material, said fields cause said predetermined portions of said material to change color and thereby provide said second optically visible state.

34. Apparatus according to claim 31 wherein said smectic liquid crystal material includes a predetermined dye molecule and wherein upon the establishment of said predetermined electric fields across predetermined portions of said smectic liquid crystal material, said fields cause said predetermined portions of said material to change color and thereby provide said second optically visible state.

35. Apparatus according to claim 32 wherein said cholesteric material includes a predetermined dye molecule and upon said production of said heat said predetermined portions of said cholesteric material changes into a different predetermined color to provide said second optically visible state.

36. Apparatus according to claim 16 wherein said optically variable liquid is a metallic dipole suspension whose normal state is a light scattering state which provides said first optically visible state, and wherein upon the establishment of said predetermined electric fields, predetermined portions of said suspension undergoing a reorientation and being changed into a transparent state and thereby providing said second optically visible state.

37. Apparatus according to claim 16 wherein said optically variable liquid is pleochroic material and wherein upon the establishment of said predetermined electric fields, predetermined portions of said pleochroic material changing color and to thereby provide said second optically visible state.

38. Apparatus according to claim 16 wherein said first optically visible state is a transparent state and wherein said second optically visible state is a light scattering state.

39. Apparatus according to claim 16 wherein said first optically visible state is a light scattering state and wherein said second optically visible state is a transparent state.

40. A chronometer according to claim 16 further comprising:

at least one additional body of semiconductive material having at least one integrated shift register circuit including a plurality of stages formed therein, said plurality of stages being different in number than the number of stages of the first said shift register, and of the stages of said shift register circuit formed in said additional body of semiconductive material being connected in parallel to the last stage of the first said shift register circuit and for receiving signals therefrom as shift pulses;

a delay circuit interconnecting the last stage with the first stage of the second said shift register circuit and for applying the output of the last stage thereof delayed by a prdetermined amount of delay to the first stage as input pulses for the second said shift register circuit;

a plurality of reflecting electrodes formed on said additional body of semiconductive material with each reflecting electrode electrically associated with a predetermined one of said shift register stages formed in said additional body of semiconductive material;

an additional body of transparent material;

a transparent electrode formed on said additional body of transparent material and said transparent electrode being electrically common to all of the second said reflecting electrodes;

said additional body of transparent material being positioned in opposed, predetermined spaced relationship with respect to said additional body of semiconductive material, and the second said transparent electrode being positioned in opposed predetermined spaced relationship with respect to the second said reflecting electrodes;

an additional body of optically variable liquid disposed between, and in intimate mechanical and electrical engagement with the second said common transparent electrode and all of the second said reflecting electrodes, said crystal material normally in a first optically visible state;

means for sealing the second said body of optically variable liquid between the second said transparent electrode and the second said reflecting electrodes; and upon the occurrence of said input pulses and said shift pulses at the second said shift register circuit, the second said shift register circuit stages being activated sequentially at a second predetermined frequency determined by the rate of the output signals from the last stage of the first said shift register circuit and said sequentially activated stages of the second said shift register circuit providing second predetermined signals and applying said second predetermined signals to the second said transparent electrode and the second said reflecting electrodes to cause said electrodes to establish predetermined electric fields sequentially at said second predetermined frequency across predetermined portions of of said optically variable liquid positioned between the second said transparent electrode and the second said reflecting electrodes to which said second predetermined signals are applied to cause said predetermined portions of said optically variable liquid to change sequentially at said second predetermined frequency from said first optically visible state to a second optically visible state and thereby provide an additional sequentially varying second optically visible state also indicative of said time.

41. A chronometer according to claim 40 wherein said stages of the second said integrated shift register circuit are formed in predetermined portions of said additional body of semiconductive material in a second predetermined geometric pattern and wherein the second said reflecting electrodes are formed on said additional body of semiconductive material in substantially said second predetermined geometric pattern and wherein the second said reflecting electrodes are electrically associated with the second said stages by being formed on said additional body of semiconductive material in direct mechanical and electrical contact with said predetermined portions of said additional body of semiconductive material having the second said stages formed therein.

42. A chronometer according to claim 40 wherein the second said reflecting electrodes are formed on said additional body of semiconductive material in a second predetermined geometric pattern and wherein said chronometer further includes an additional plurality of lands provided on said additional body of semiconductive material intermediate the second said shift register stages and the second said reflecting electrodes and for electrically associating the second said shift rgister stages with the second said reflecting electrodes.

43. A chronometer according to claim 40 wherein the second said reflecting electrodes are provided in predetermined physical configurations.

44. A chronometer according to claim 40 wherein said second optically visible state is a light scattering state and wherein the second said reflecting electrodes have predetermined normally visible indicia formed therein which indicia are obscured by the second said portions of said optically variable liquid when in said light scattering state.

45. Apparatus according to claim 40 further comprising: a plurality of integrated drive circuits, formed in said additional body of semiconductive material, each drive circuit interconnected between one of the second said shift register stages and the reflecting electrode electrically associated therewith, the second said drive circuits for receiving said second predetermined signals and for amplifying second predetermined signals into second predetermined signals at said second predetermined frequency; and wherein said second predetermined signals are applied sequentially to the second said transparent electrode and the second said reflecting electrodes to establish the second said predetermined electric fields.

46. Apparatus according to claim 40 wherein the second said transparent electrode is evaporated, sputtered or sprayed directly on said additional body of transparent material and the second said transparent electrode is chosen from a group of materials including tin oxide, indium oxide, and indium-antimony oxide.

47. Apparatus according to claim 40 wherein said additional body of transparent material is glass.

48. Apparatus according to claim 40 wherein said reflecting electrodes are formed in said body of semiconductive material by being evaporated directly on said body of active material and wherein said reflecting electrodes are chosen from a group of materials consisting of aluminum, gold, silver and combinations thereof.

49. Apparatus according to claim 40 wherein each of said reflecting electrodes further includes a transparent coating for rendering said reflecting electrodes chemically inert with respect to said body of optically variable liquid.

50. Apparatus according to claim 49 wherein said coating is chosen from a group of materials consisting of tin oxide, indium oxide and indium-antimony oxide.

51. Apparatus according to claim 40 wherein said predetermined electric fields are longitudinal electric fields.

52. Apparatus according to claim 40 wherein said body of optically variable liquid is mesomorphic matter.

52. Apparatus according to claim 40 wherein said mesomorphic matter is nematic liquid crystal material.

54. Apparatus according to claim 40 wherein said mesomorphic matter is smectic liquid crystal material.

55. Apparatus according to claim 40 wherein said mesomorphic matter is cholesteric material wherein upon said application of said first predetermined signals to said transparent electrode and said reflecting electrodes, said electrodes produce heat which heat causes predetermined portions of said cholesteric material to change into a predetermined color and thereby provide said second optically visible state.

56. Apparatus according to claim 53 wherein said nematic liquid crystal material includes a predetermined dye molecule and wherein upon the establishment of said predetermined electric fields across predetermined portions of said nematic liquid crystal material, said fields cause said predetermined portions of said material to change color and thereby provide said second optically visible state.

57. Apparatus according to claim 54 wherein said smectic liquid crystal material includes a predetermined dye molecule and wherein upon the establishment of said predetermined electric fields across predetermined portions of said smectic liquid crystal material, said fields cause said predetermined portions of said material to change color and thereby provide said second optically visible state.

58. Apparatus according to claim 55 wherein said cholesteric material includes a predetermined dye molecule and upon said production of said heat said predetermined portions of said cholesteric material change into a different predetermined color to provide said second optically visible state.

59. Apparatus according to claim 40 wherein said optically variable liquid is a metallic dipole suspension whose normal state is a light scattering state which provides said first optically visible state, and wherein upon the establishment of said predetermined electric fields, predetermined portions of said suspension undergoing a reorientation and being changed into a transparent state and thereby providing said second optically visible state.

60. Apparatus according to claim 40 wherein said optically variable liquid is pleochroic material and wherein upon the establishment of said predetermined electric fields, predetermined portions of said pleochroic material changing color and to thereby provide said second optically visible state.

61. Apparatus according to claim 40 wherein said first optically visible state is a transparent state and wherein said second optically visible state is a light scattering state.

62. Apparatus according to claim 40 wherein said first optically visible state is a light scattering state and wherein said second optically visible state is a transparent state.

63. A chronometer for providing a plurality of visible displays indicative of a plurality of units of time, comprising:

pulse providing means for providing pulses at a predetermined frequency related to said time;

a body of semiconductive material having a plurality of serially interconnected integrated shift register circuits formed therein with each shift register circuit including a different number of stages and said plurality of shift register circuits being equal in number to said plurality of units of time, and said body of semiconductive material having a plurality of integrated delay circuits formed therein equal in number to said shift register circuits, each delay circuit interconnecting the last stage of one of said shift register circuits with the first stage thereof and for applying the output of said last stage as input pulses for said shift register;

a plurality of groups of reflecting electrodes and each of said groups for providing one of said visible displays indicative of one of said units of time, said groups of reflecting electrodes being equal in number to said shift register circuits and each of said groups including reflecting electrodes equal in number to the stages of one of said shift register circuits, groups of reflecting electrodes and shift register circuits having corresponding numbers of reflecting electrodes and stages, respectively, being associated, and each reflecting electrode of each group being electrically associated with a predetermined one of the stages of the associated shift register circuit;

a body of transparent material disposed from and opposed to said body of semiconductive material;

a transparent electrode formed on said body of transparent material opposite said reflecting electrodes and displaced therefrom; said transparent electrode being electrically common to all of said reflecting electrodes;

a body of optically variable liquid disposed between said reflecting electrodes and said transparent electrode and in electrical engagement with said electrodes, said body of optically variable liquid normally in a first optically visible state;

means for sealing said body of optically variable liquid between said reflecting electrodes and said transparent electrode;

all of the stages of the first shift register circuit of said serially interconnected plurality connected in parallel with said pulse providing means and for receiving said pulses at said predetermined frequency which received pulses act as shift pulses for said first shift register and which shift pulses in combination with said input pulses to said shift register cause the stages of said first shift register to provide output signals in a predetermined sequence and at a predetermined rate, and all the stages of each succeeding shift register circuit in said serially connected plurality in parallel to the last stage of the preceding shift register and for receiving output signals from the last stage of the next preceding shift register circuit which received output signals act as shift pulses for the respective succeeding shift register circuits and which shift pulses in combination with said input pulses to said shift registers cause the stages of each succeeding shift register circuit to provide respective output signals in a predetermined sequence and at a predetermined rate; each of said predetermined rates at which said respective sequential output signals are provided by the stages of each of said shift register circuits being different from the other and related to one of said units of time; and upon said respective output signals provided by said respective shift register circuits being applied sequentially to said transparent electrode and to the reflecting electrodes of the respectively associated reflecting electrode groups, said reflecting electrodes of said groups and said transparent electrode establishing a plurality of predetermined electric fields sequentially at said respective predetermined rates across the respective portions of said optically variable liquid disposed between said transparent electrode and said respective groups of reflecting electrodes, said plurality of sequential electric fields causing said respective portions of said optically variable liquid to change sequentially at said respective predetermined rates from said first optically visible state to a second optically visible state and thereby provide a plurality of second optically visible states indicative respectively of said plurality of units of time.

64. A chronometer according to claim 63 wherein said stages of each of said integrated shift register circuits are formed in said body of semiconductive material in a respective predetermined geometric pattern and wherein said reflecting electrodes of each of said groups are formed on said body of semiconductive material in substantially said same predetermined geometric pattern as the stages of respectively associated shift register circuits and wherein said reflecting electrodes are electrically associated with said stages as said by being formed on said body of semiconductive material in direct mechanical and electrical contact with said predetermined portions of said body of semiconductive material having said stages formed therein.

65. A chronometer according to claim 63 wherein said reflecting electrodes are formed on said body of semiconductive material by being evaporated directly thereon and wherein said reflecting electrodes are chosen from a group of materials including aluminum, gold and silver.

66. A chronometer according to claim 63 wherein said reflecting electrodes of each of said groups are formed on said body of semiconductive material in a respective predetermined geometric pattern and wherein said chronometer further includes a plurality of lands provided on said body of semiconductive material intermediate said shift register stages and said reflecting electrodes and for electrically associating said shift register stages with said reflecting electrodes.

67. A chronometer according to claim 63 wherein said reflecting electrodes are provided in predetermined physical configurations.

68. A chronometer according to claim 63 wherein said reflecting electrodes have predetermined normally visible indicia formed therein which indicia are sequentially obscured by said portions of nematic liquid crystal material when in said light scattering state.

69. A chronometer according to claim 63 wherein said pulse providing means for providing said electrical pulse at said predetermined frequency includes a piezoelectric crystal oscillator for providing electrical pulses at a frequency higher than said predetermined frequency and a counter for receiving said pulses at said higher frequency and for counting said pulses down to said predetermined frequency.

70. A chronometer according to claim 63 comprising:
a plurality of integrated drive circuits formed in said body of semiconductive material, each drive circuit interconnected betweeen one of said shift register stages and the reflecting electrode electrically associated therewith, said drive circuits for receiving said output signals from said shift register stages and for amplifying said output signals and for applying the amplified output signals to said transparent electrode and said reflecting electrodes to establish said longitudinal electric fields.

71. A chronometer according to claim 63 wherein said transparent electrode is evaporated, sputtered or sprayed directly on said body of transparent material and said transparent electrode is chosen from a group of materials including tin oxide, indium oxide and indiumantimony oxide.

72. A chronometer according to claim 63 wherein said body of transparent material is glass.

73. A chronometer according to claim 63 wherein one of said units of time is seconds.

74. A chronometer according to claim 63 wherein one of said units of time is minutes.

75. A chronometer according to claim 63 wherein one of said units of time is hours.

76. A chronometer according to claim 63 wherein one of said units of time is days.

77. Apparatus according to claim 63 wherein said reflecting electrodes are formed in said body of semiconductive material by being evaporated directly on said body of active material and wherein said reflecting electrodes are chosen from a group of materials consisting of aluminum, gold, silver and combinations thereof.

78. Apparatus according to claim 77 wherein each of said reflecting electrodes further includes a transparent coating for rendering said reflecting electrodes chemically inert with respect to said body of optically variable liquid.

79. Apparatus according to claim 78 wherein said coating is chosen from a group of materials consisting of tin oxide, indium oxide and indium-antimony oxide.

80. Apparatus according to claim 63 wherein said predetermined electric fields are longitudinal electric fields.

81. Apparatus according to claim 63 wherein said body of optically variable liquid is mesomorphic matter.

82. Apparatus according to claim 81 wherein said mesomorphic matter is nematic liquid crystal material.

83. Apparatus according to claim 81 wherein said mesomorphic matter is smectic liquid crystal material.

84. Apparatus according to claim 81 wherein said mesomorphic matter is cholesteric material and wherein upon said application of said signals to said transparent electrode and said reflecting electrodes, said electrodes produce heat which heat causes predetermined portions of said cholesteric material to change into a predetermined color and thereby provide said second optically visible state.

85. Apparatus according to claim 82 wherein said nematic liquid crystal material includes a predetermined dye molecule and wherein upon the establishment of said predetermined electric fields across predetermined portions of said nematic liquid crystal material, said fields cause said predetermined portions of said material to change color and thereby provide said second optically visible state.

86. Apparatus according to claim 83 wherein said smectic liquid crystal material includes a predetermined dye molecule and wherein upon the establishment of said predetermined electric field across predetermined portions of said smectic liquid crystal material, said fields cause said predetermined portions of said material to change color and thereby provide said second optically visible state.

87. Apparatus according to claim 84 wherein said cholesteric material includes a predetermined dye molecule and upon said production of said heat said predetermined portions of said cholesteric material change into a different predetermined color to provide said second optically visible state.

88. Apparatus according to claim 63 wherein said optically variable liquid is a metallic dipole suspension whose normal state is a light scattering state which provides said first optically visible state, and wherein upon the establishment of said predetermined electric fields, predetermined portions of said suspension undergoing a reorientation and being changed into a transparent state and thereby providing said second optically visible state.

89. Apparatus according to claim 63 wherein said optically variable liquid is pleochroic material and wherein upon the establishment of said predetermined electric fields, predetermined portions of said pleochoric material changing color and to thereby provide said second optically visible state.

90. Apparatus according to claim 63 wherein said first optically visible state is a transparent state and wherein said second optically visible state is a light scattering state.

91. Apparatus according to claim 63 wherein said first optically visible state is a light scattering state and wherein said second optically visible state is a transparent state.

92. A chronometer for providing a plurality of visible displays indicative of a plurality of units of time, comprising:
pulse providing means for providing pulses at a predetermined frequency related to said time;
a body of semiconductive material having a plurality of serially interconnected integrated shift register circuits formed therein with each shift register circuit including a different number of stages and said plurality of shift register circuits being equal in number to said plurality of units of time, and said active body of material having a plurality of integrated delay circuits formed therein equal in number to said shift register circuits, each delay circuit interconnecting the last stage of one of said shift register circuits with the first stage thereof and for applying the output of said last stage delayed by a predetermined amount of delay to said first stage as input pulses for said shift register, each of said delay circuits providing a different amount of delay;

a plurality of groups of reflecting electrodes and each of said groups for providing one of said visible displays indicative of one of said units of time, said groups of reflecting electrodes being equal in number to said shift register circuits and each of said groups including reflecting electrodes equal in number to the stages of one of said shift register circuits, groups of reflecting electrodes and shift register circuits having corresponding numbers of reflecting electrodes and stages, respectively, being associated, and each reflecting electrode of each group being electrically associated with a predetermined one of the stages of the associated shift register circuit;

a plurality of bodies of transparent material equal in number to said shift register circuits, each of said bodies of transparent material being associated with one of said groups of reflecting electrodes by being opposed to one of said groups of reflecting electrodes;

a plurality of electrodes equal in number to said bodies of transparent material; each of said transparent electrodes being formed on one of said bodies of transparent material opposite to and displaced from the group of reflecting electrodes associated with said one body of transparent material; each of said transparent electrodes being associated with and electrically common with all of the reflecting electrodes of the group opposite thereto;

a plurality of bodies of optically variable liquid equal in number to said transparent electrodes, each of said bodies of optically variable liquid being associated with one of said groups of reflecting electrodes and its associated transparent electrode by being disposed between and in mechanical engagement with one of said groups of reflecting electrodes and its associated transparent electrode, and each of said bodies of optically variable liquid normally in a first optically visible state;

means for sealing said bodies of optically variable liquid between said respectively associated groups of reflecting electrodes and said associated transparent electrodes;

all of the stages of the first shift register circuit of said serially interconnected plurality connected in parallel with said pulse providing means and for receiving said pulses at said predetermined frequency which received pulses act as shift pulses for said first shift register and which shift pulses in combination with said input pulses to said shift register cause the stages of said first shift register to provide output signals in a predetermined sequence and at a predetermined rate, and all the stages of each succeeding shift register circuit in said serially connected plurality connected in parallel to the last stage of the preceding shift register and for receiving output signals from the last stage of the next preceding shift register circuit which received output signals act as shift pulses for the respective succeeding shift register circuits and which shift pulses in combination with said input pulses to said shift registers cause the stages of each succeeding shift register circuit to provide respective output signals in a predetermined sequence and at a predetermined rate; each of said predetermined rates at which said respective sequential output signals are provided by the stages of each of said shift register circuits being different from the other and related to one of said units of time; and upon each of said respective output signals provided by said respective shift register circuits being applied sequentially to a predetermined one of said transparent electrodes and to the reflecting electrodes of the respectively associated reflecting electrode group, said reflecting electrodes of said groups and said respectively associated transparent electrodes establishing a plurality of predetermined electric fields sequentially at said respective predetermined rates across the respective portions of said bodies of optically variable liquid disposed between said transparent electrodes and said respectively associated groups of reflecting electrodes receiving said output signals, said plurality of sequential electric fields causing said respective portions of said bodies of optically variable liquid to change sequentially at said respective predetermined rates from said first optically visible state to a second optically visible state and thereby provide a plurality of second optically visible states indicative respectively of said plurality of units of time.

93. A chronometer according to claim 92 wherein said stages of each of said integrated shift register circuits are formed in said body of semiconductive material in a respective predetermined geometric pattern and wherein said reflecting electrodes of each of said groups are formed on said body of semiconductive material in substantially said same predetermined geometric pattern as the stages of respectively associated shift register circuits and wherein said reflecting electrodes are electrically associated with said stages as said by being formed on said body of semiconductive material in a direct mechanical and electrical contact with said predetermined portions of said body of semiconductive material having said stages formed therein.

94. A chronometer according to claim 93 wherein said reflecting electrodes are formed on said body of semiconductive material by being evaporated directly thereon and wherein said reflecting electrodes are chosen from a group of materials including aluminum, gold and silver.

95. A chronometer according to claim 92 wherein said reflecting electrodes of each of said groups are formed on said body of semiconductive material in a respective predetermined geometric pattern and wherein said chronometer further includes a plurality of lands provided on said body of semiconductive material intermediate said shift register stages and said reflecting electrodes and for electrically associating said shift register stages with said reflecting electrodes.

96. A chronometer according to claim 92 wherein said reflecting electrodes are provided in predetermined physical configurations.

97. A chronometer according to claim 92 wherein said pulse providing means for providing said electrical pulse at said predetermined frequency includes a piezoelectric crystal oscillator for providing electrical pulses at a frequency higher than said predetemined frequency and a counter for receiving said pulses at said high frequency and for counting said pulses down to said predetermined frequency.

98. A chronometer according to claim 92 comprising:

a plurality of integrated drive circuits formed in said body of semiconductive material, each drive circuit interconnected between one of said shift register stages and the reflecting electrode electrically associated therewith, said drive circuits for receiving said output signals from said shift register stages and for amplifying said output signals and for applying the amplified output signals to said respectively associated transparent electrodes and reflecting electrodes to establish said plurality of sequential predetermined electric fields.

99. A chronometer according to claim 92 wherein said transparent electrodes are evaporated, sputtered or sprayed directly on said respectively associated bodies of transparent material and said transparent electrodes are chosen from a group of materials consisting of tin oxide, indium oxide and indiumantimony oxide.

100. A chronometer according to claim 92 wherein said bodies of transparent material are glass.

101. A chronometer according to claim 92 wherein one of said units of time is seconds.

102. A chronometer according to claim 92 wherein one of said units of time is minutes.

103. A chronometer according to claim 92 wherein one of said units of time is hours.

104. A chronometer according to claim 92 wherein one of said units of time is days.

105. Apparatus according to claim 92 wherein said reflecting electrodes are associated with said body of semiconductive material by being evaporated directly on said body of active material and wherein said reflecting electrodes are chosen from a grop of materials consisting of aluminum, gold, silver and combinations thereof.

106. Apparatus according to claim 105 wherein each of said reflecting electrodes further includes a transparent coating for rendering said reflecting electrodes chemically inert with respect to said body of optically variable liquid.

107. Apparatus according to claim 106 wherein said coating is chosen from a group of materials consisting of tin oxide, indium oxide and indium-antimony oxide.

108. Apparatus according to claim 92 wherein said predetermined electric fields are longitudinal electric fields.

109. Apparatus according to claim 92 wherein said body of optically variable liquid is mesomorphic matter.

110. Apparatus according to claim 109 wherein said mesomorphic matter is nematic liquid crystal material.

111. Apparatus according to claim 109 wherein said mesomorphic matter is smectic liquid crystal material.

112. Apparatus according to claim 109 wherein said mesomorphic matter is cholesteric material and wherein upon said application of said signals to said transparent electrode and said reflecting electrodes, said electrodes produce heat which heat causes predetermined portions of said cholesteric material to change into a predetermined color and thereby provide said second optically visible state.

113. Apparatus according to claim 110 wherein said nematic liquid crystal material includes a predetermined dye molecule and wherein upon the establishment of said predetermined electric fields across predetermined portions of said nematic liquid crystal material, said fields cause said predetermined portions of said material to change color and thereby provide said second optically visible state.

114. Apparatus according to claim 110 wherein said smectic liquid crystal material includes a predetermined dye molecule wherein upon the establishment of predetermined electric fields across predetermined portions of said smectic liquid crystal material, said fields cause said predetermined portions of said material to change color and thereby provide said second optically visible state.

115. Apparatus according to claim 112 wherein said cholesteric material includes a predetermined dye molecule and upon said production of said heat said predetermined portions of said cholesteric material change into a different predetermined color to provide said second optically visible state.

116. Apparatus according to claim 92 wherein said optically variable liquid is a metallic dipole suspension whose normal state is a light scattering state which provides said first optically visible state, and wherein upon the establishment of said predetermined electric fields, predetermined portions of said suspension undergoing a reorientation and being changed into a transparent state and thereby providing said second optically visible state.

117. Apparatus according to claim 92 wherein said optically variable liquid is pleochroic material and wherein upon the establishment of said predetermined electric fields, predetermined portions of pleochroic material changing color and to thereby provide said second optically visible state.

118. Apparatus according to claim 92 wherein said first optically visible state is a transparent state and wherein said second optically visible state is a light scattering state.

119. Apparatus according to claim 92 wherein said first optically visible state is a light scattering state and wherein said second optically visible state is a transparent state.

* * * * *

UNITED STATES PATENT OFFICE
CERTIFICATE OF CORRECTION

Patent No. 3,772,874      Dated November 20, 1973

Inventor(s) Issai Lefkowitz

It is certified that error appears in the above-identified patent and that said Letters Patent are hereby corrected as shown below:

Column 6, line 53, "diaplay" should read -- display --. Column 9, line 49, before "register" insert -- shift --. Column 12, line 27, after "electrode" insert -- R --. Column 13, lines 13 - 26, should read -- , and will provide a first optically visible condition or state viewable through the analyzer as shown. Upon the application of an electric field across the electro-optic liquid in response to a suitable input signal to the signal input means I, the electro-optic liquid will undergo the noted optical retardation or rotation and the body of active material A of FIG. 17 or reflecting electrode R of FIG. 18 will be at least partially obscured with respect to the polarized light and a second optical condition or state will be visible through the analyzer. --; line 42, "for" should read -- --. Column 14, line 67, after "stage" and before "material" -- is sufficiently high to activate the optically variable liquid --. Column 21, line 2, "9a" should be deleted. line 58, "wereein" should read -- wherein --. Column 22, line 13,

FORM PO-1050 (10-69)

UNITED STATES PATENT OFFICE
CERTIFICATE OF CORRECTION

Patent No. 3,772,874     Dated November 20, 1973

Inventor(s) Issai Lefkowitz     Page - 2

It is certified that error appears in the above-identified patent and that said Letters Patent are hereby corrected as shown below:

"wbcih" should read -- which --. Column 30, line 17, "52" should read -- 53 --. Column 31, line 39, "disposed" should read -- displaced --. Column 35, line 24, after "of" insert -- transparent --. Column 37, line 19, "indiumantimony" should read -- indium-antimony --; line 34, "grop" should read -- group --. Column 38, line 17, "110" should read -- 111 --.

Signed and sealed this 24th day of September 1974.

(SEAL)
Attest:

McCOY M. GIBSON JR.
Attesting Officer

C. MARSHALL DANN
Commissioner of Patents